US008736620B2

(12) United States Patent
Hutchins et al.

(10) Patent No.: US 8,736,620 B2
(45) Date of Patent: May 27, 2014

(54) KILL BIT GRAPHICS PROCESSING SYSTEM AND METHOD

(75) Inventors: Edward A. Hutchins, Mountain View, CA (US); Brian K. Angell, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 10/846,201

(22) Filed: May 14, 2004

(65) Prior Publication Data

US 2005/0280655 A1   Dec. 22, 2005

(51) Int. Cl.
*G06T 1/20* (2006.01)
*G06F 15/16* (2006.01)
*G06T 1/60* (2006.01)

(52) U.S. Cl.
USPC .......................... 345/506; 345/502; 345/530

(58) Field of Classification Search
USPC .................. 345/506, 502, 501, 556, 530
See application file for complete search history.

(56) References Cited

U.S. PATENT DOCUMENTS

| | | |
|---|---|---|
| 4,620,217 A | 10/1986 | Songer |
| 4,648,045 A | 3/1987 | Demetrescu |
| 4,667,308 A | 5/1987 | Hayes et al. |
| 4,700,319 A | 10/1987 | Steiner |
| 4,862,392 A | 8/1989 | Steiner |
| 4,901,224 A | 2/1990 | Ewert |
| 5,185,856 A | 2/1993 | Alcorn et al. |
| 5,268,995 A | 12/1993 | Diefendorff et al. |
| 5,270,687 A | 12/1993 | Killebrew, Jr. |
| 5,285,323 A | 2/1994 | Hetherington et al. |
| 5,357,604 A | 10/1994 | San et al. |
| 5,392,393 A | 2/1995 | Deering |
| 5,487,022 A | 1/1996 | Simpson et al. |
| 5,488,687 A | 1/1996 | Rich |
| 5,491,496 A | 2/1996 | Tomiyasu |
| 5,557,298 A * | 9/1996 | Yang et al. ............... 715/781 |

(Continued)

FOREIGN PATENT DOCUMENTS

| | | |
|---|---|---|
| CN | 1954338 | 4/2007 |
| CN | 101091203 | 12/2007 |

(Continued)

OTHER PUBLICATIONS

"Sideband," http://www.encyclopedia.com/html/s1/sideband.asp.*

(Continued)

*Primary Examiner* — Joni Richer

(57) ABSTRACT

A present invention pixel processing system and method permit complicated three dimensional images to be rendered with shallow graphics pipelines including reduced gate counts and also facilitates power conservation. Pixel packet information includes pixel surface attribute values are retrieved in a single unified data fetch stage. At a data fetch pipestage a determination may be made if the pixel packet information contributes to an image display presentation (e.g., a depth comparison of Z values is performed determine if the pixel is occluded). A pixel packet status indicator (e.g., a kill bit) is set in the sideband portion of a pixel packet and the pixel packet is forwarded for processing in accordance with the pixel packet status indicator. The status indicator is a kill bit is set to prevent logic components from clocking information for a payload portion of the pixel packet if the status indicator indicates the pixel packet payload does not contribute to the image display presentation while continuing to clock pixel packet sideband information.

31 Claims, 23 Drawing Sheets

(56) References Cited

U.S. PATENT DOCUMENTS

| | | |
|---|---|---|
| 5,577,213 A | 11/1996 | Avery et al. |
| 5,579,473 A | 11/1996 | Schlapp et al. |
| 5,579,476 A | 11/1996 | Cheng et al. |
| 5,581,721 A | 12/1996 | Wada et al. |
| 5,600,584 A | 2/1997 | Schlafly |
| 5,604,824 A | 2/1997 | Chui et al. |
| 5,613,050 A | 3/1997 | Hochmuth et al. |
| 5,655,132 A | 8/1997 | Watson |
| 5,701,444 A | 12/1997 | Baldwin |
| 5,748,202 A * | 5/1998 | Nakatsuka et al. ......... 345/556 |
| 5,764,228 A | 6/1998 | Baldwin |
| 5,777,628 A | 7/1998 | Buck-Gengler |
| 5,808,617 A | 9/1998 | Keworthy et al. |
| 5,818,456 A * | 10/1998 | Cosman et al. ............. 345/614 |
| 5,831,640 A | 11/1998 | Wang et al. |
| 5,844,569 A | 12/1998 | Eisler et al. |
| 5,850,572 A | 12/1998 | Dierke |
| 5,864,342 A * | 1/1999 | Kajiya et al. ................ 345/418 |
| 5,941,940 A | 8/1999 | Prasad et al. |
| 5,977,977 A | 11/1999 | Kajiya et al. |
| 5,995,121 A | 11/1999 | Alcorn et al. |
| 6,002,410 A | 12/1999 | Battle |
| 6,118,452 A * | 9/2000 | Gannett ....................... 345/418 |
| 6,166,743 A | 12/2000 | Tanaka |
| 6,173,366 B1 | 1/2001 | Thayer et al. |
| 6,222,550 B1 | 4/2001 | Rosman et al. |
| 6,229,553 B1 | 5/2001 | Duluk, Jr. et al. |
| 6,259,460 B1 | 7/2001 | Gossett et al. |
| 6,259,461 B1 * | 7/2001 | Brown ......................... 345/556 |
| 6,288,730 B1 | 9/2001 | Duluk, Jr. et al. |
| 6,313,846 B1 | 11/2001 | Fenney et al. |
| 6,333,744 B1 | 12/2001 | Kirk et al. |
| 6,351,806 B1 | 2/2002 | Wyland |
| 6,353,439 B1 | 3/2002 | Lindholm et al. |
| 6,407,740 B1 | 6/2002 | Chan |
| 6,411,130 B1 | 6/2002 | Gater |
| 6,411,301 B1 | 6/2002 | Parikh et al. |
| 6,417,851 B1 | 7/2002 | Lindholm et al. |
| 6,466,222 B1 | 10/2002 | Kao et al. |
| 6,496,537 B1 | 12/2002 | Kranawetter et al. |
| 6,516,032 B1 | 2/2003 | Heirich et al. |
| 6,525,737 B1 | 2/2003 | Duluk, Jr. et al. |
| 6,526,430 B1 | 2/2003 | Hung et al. |
| 6,542,971 B1 | 4/2003 | Reed |
| 6,557,022 B1 | 4/2003 | Sih et al. |
| 6,597,363 B1 | 7/2003 | Duluk, Jr. et al. |
| 6,604,188 B1 | 8/2003 | Conn et al. |
| 6,624,818 B1 | 9/2003 | Mantor et al. |
| 6,636,214 B1 | 10/2003 | Leather et al. |
| 6,636,221 B1 | 10/2003 | Morein |
| 6,636,223 B1 | 10/2003 | Morein |
| 6,664,958 B1 | 12/2003 | Leather et al. |
| 6,670,955 B1 | 12/2003 | Morein |
| 6,693,643 B1 | 2/2004 | Trivedi et al. |
| 6,717,577 B1 | 4/2004 | Cheng et al. |
| 6,731,288 B2 | 5/2004 | Parsons et al. |
| 6,734,861 B1 | 5/2004 | Van Dyke et al. |
| 6,745,390 B1 | 6/2004 | Reynolds et al. |
| 6,778,181 B1 | 8/2004 | Kilgariff et al. |
| 6,806,886 B1 | 10/2004 | Zatz |
| 6,819,331 B2 | 11/2004 | Shih et al. |
| 6,839,828 B2 | 1/2005 | Gschwind et al. |
| 6,879,328 B2 | 4/2005 | Deering |
| 6,912,695 B2 | 6/2005 | Ernst et al. |
| 6,924,808 B2 | 8/2005 | Kurihara et al. |
| 6,947,053 B2 | 9/2005 | Malka et al. |
| 6,980,209 B1 | 12/2005 | Donham et al. |
| 6,980,222 B2 | 12/2005 | Marion et al. |
| 6,999,100 B1 | 2/2006 | Leather et al. |
| 7,034,828 B1 | 4/2006 | Drebin et al. |
| 7,042,462 B2 | 5/2006 | Kim et al. |
| 7,145,566 B2 | 12/2006 | Karlov |
| 7,158,141 B2 | 1/2007 | Chung et al. |
| 7,187,383 B2 | 3/2007 | Kent |
| 7,257,814 B1 | 8/2007 | Melvin et al. |
| 7,280,112 B1 | 10/2007 | Hutchins |
| 7,298,375 B1 | 11/2007 | Hutchins |
| 7,450,120 B1 | 11/2008 | Hakura et al. |
| 7,477,260 B1 | 1/2009 | Nordquist |
| 7,659,909 B1 | 2/2010 | Hutchins |
| 7,710,427 B1 | 5/2010 | Hutchins et al. |
| 7,928,990 B2 | 4/2011 | Jiao et al. |
| 7,941,645 B1 | 5/2011 | Riach et al. |
| 7,969,446 B2 | 6/2011 | Hutchins et al. |
| 8,537,168 B1 | 9/2013 | Steiner et al. |
| 2002/0105519 A1 | 8/2002 | Lindholm et al. |
| 2002/0126126 A1 | 9/2002 | Baldwin |
| 2002/0129223 A1 | 9/2002 | Takayama et al. |
| 2002/0169942 A1 | 11/2002 | Sugimoto |
| 2003/0115233 A1 | 6/2003 | Hou et al. |
| 2003/0189565 A1 | 10/2003 | Lindholm et al. |
| 2004/0012597 A1 | 1/2004 | Zatz et al. |
| 2004/0012599 A1 | 1/2004 | Laws |
| 2004/0012600 A1 | 1/2004 | Deering et al. |
| 2004/0024260 A1 | 2/2004 | Winkler et al. |
| 2004/0078504 A1 * | 4/2004 | Law et al. ..................... 710/100 |
| 2004/0100474 A1 | 5/2004 | Demers et al. |
| 2004/0114813 A1 | 6/2004 | Boliek et al. |
| 2004/0119710 A1 | 6/2004 | Piazza et al. |
| 2004/0126035 A1 | 7/2004 | Kyo |
| 2004/0130552 A1 | 7/2004 | Duluk, Jr. et al. |
| 2004/0246260 A1 | 12/2004 | Kim et al. |
| 2005/0122330 A1 | 6/2005 | Boyd et al. |
| 2005/0134588 A1 | 6/2005 | Aila et al. |
| 2005/0135433 A1 | 6/2005 | Chang et al. |
| 2005/0162436 A1 | 7/2005 | Van Hook et al. |
| 2005/0223195 A1 | 10/2005 | Kawaguchi |
| 2005/0231506 A1 | 10/2005 | Simpson et al. |
| 2005/0237337 A1 | 10/2005 | Leather et al. |
| 2005/0280655 A1 | 12/2005 | Hutchins et al. |
| 2006/0007234 A1 | 1/2006 | Hutchins et al. |
| 2006/0028469 A1 | 2/2006 | Engel |
| 2006/0152519 A1 | 7/2006 | Hutchins et al. |
| 2006/0155964 A1 | 7/2006 | Totsuka |
| 2006/0177122 A1 | 8/2006 | Yasue |
| 2006/0288195 A1 | 12/2006 | Ma et al. |
| 2007/0165029 A1 | 7/2007 | Lee et al. |
| 2007/0279408 A1 | 12/2007 | Zheng et al. |
| 2007/0285427 A1 | 12/2007 | Morein et al. |

FOREIGN PATENT DOCUMENTS

| | | |
|---|---|---|
| EP | 1665165 | 6/2006 |
| EP | 1745434 | 1/2007 |
| EP | 1771824 | 4/2007 |
| JP | 62080785 | 4/1987 |
| JP | 05150979 | 6/1993 |
| JP | 11053187 | 2/1999 |
| JP | 2000047872 | 2/2000 |
| JP | 2002073330 | 3/2002 |
| JP | 2002171401 | 6/2002 |
| JP | 2004199222 | 7/2004 |
| JP | 2006196004 | 7/2006 |
| JP | 2008161169 | 7/2008 |
| WO | 2005112592 | 12/2005 |
| WO | 2005114582 | 12/2005 |
| WO | 2005114646 | 12/2005 |
| WO | 2006007127 | 1/2006 |

OTHER PUBLICATIONS

Hutchins et al., Patent Application Entitled "A Unified Data Fetch Graphics Processing System and Method", U.S. Appl. No. 10/845,986, filed May 14, 2004.

Battle, J., Patent Application Entitled "Arbitrary Size Texture Palettes for Use in Graphics Systems", U.S. Appl. No. 10/845,664, filed May 14, 2004.

Hutchins et al., Patent Application Entitled "An Early Kill Removal Graphics Processing System and Method", U.S. Appl. No. 10/845,662, filed May 14, 2004.

Hutchins et al., Patent Application Entitled "A Single Threat Graphics Processing System and Method", U.S. Appl. No. 10/846,192, filed May 14, 2004.

(56) References Cited

OTHER PUBLICATIONS

Final Office Action, Mail Date Jan. 31, 2006; U.S. Appl. No. 10/846,208.
Final Office Action, Mail Date Jul. 27, 2007; U.S. Appl. No. 10/846,208.
Final Office Action, Mail Date Sep. 22, 2008; U.S. Appl. No. 10/846,208.
Non Final Office Action, Mail Date Jan. 14, 2008; U.S. Appl. No. 10/846,208.
Non Final Office Action, Mail Date May 1, 2009; U.S. Appl. No. 10/846,208.
Non Final Office Action, Mail Date May 3, 2005; U.S. Appl. No. 10/846,208.
Non Final Office Action, Mail Date Oct. 19, 2006; U.S. Appl. No. 10/846,208.
Final Office Action, Mail Date Nov. 26, 2007; U.S. Appl. No. 10/845,986.
Non Final Office Action, Mail Date Jan. 9, 2009; U.S. Appl. No. 10/845,986.
Non Final Office Action, Mail Date Mar. 29, 2007; U.S. Appl. No. 10/845,986.
Non Final Office Action, Mail Date Jun. 17, 2008; U.S. Appl. No. 10/845,986.
Final Office Action, Mail Date Apr. 22, 2009; U.S. Appl. No. 10/845,662.
Non Final Office Action, Mail Date Mar. 29, 2007; U.S. Appl. No. 10/845,662.
Final Office Action, Mail Date Mar. 6, 2008; U.S. Appl. No. 10/845,662.
Non Final Office Action, Mail Date Sep. 26, 2008; U.S. Appl. No. 10/845,662.
Final Office Action, Mail Date Jun. 5, 2009; U.S. Appl. No. 10/846,192.
Final Office Action, Mail Date Nov. 6, 2007; U.S. Appl. No. 10/846,192.
Non Final Office Action, Mail Date Jan. 12, 2009; U.S. Appl. No. 10/846,192.
Non Final Office Action, Mail Date Mar. 30, 2007; U.S. Appl. No. 10/846,192.
Non Final Office Action, Mail Date May 16, 2008; U.S. Appl. No. 10/846,192.
Non Final Office Action, Mail Date May 15, 2008; U.S. Appl. No. 10/845,664.
Non Final Office Action, Mail Date Jan. 13, 2009; U.S. Appl. No. 10/845,664.
Final Office Action, Mail Date Nov. 29, 2007; U.S. Appl. No. 10/845,664.
Final Office Action, Mail Date Jul. 26, 2006; U.S. Appl. No. 10/845,664.
Non Final Office Action, Mail Date Mar. 20, 2007; U.S. Appl. No. 10/845,664.
Non Final Office Action, Mail Date Dec. 16, 2005; U.S. Appl. No. 10/845,664.
Non Final Office Action, Mail Date May 23, 2005; U.S. Appl. No. 10/845,664.
PCT Notification of Transmittal of The International Search Report and The Written Opinion of the International Searching Authority, or the Declaration. PCT/US05/17032; Applicant Nvidia Corporation; Mail Date Nov. 9, 2005.
PCT Notification of Transmittal of The International Search Report or the Declaration. PCT/US05/17526; Applicant Hutchins, Edward A; Mailing Date Jan. 17, 2006.
PCT Notification of Transmittal of The International Search Report and The Written Opinion of the International Searching Authority, or the Declaration. PCT/US05/17031; Applicant Nvidia Corporation; Mail Date Dec. 9, 2007.
Pixar, Inc.; PhotoRealistic RenderMan 3.9 Shading Language Extensions; Sep. 1999.
Final Office Action Dated Jan. 12, 2010; U.S. Appl. No. 10/846,208.
Final Office Action Dated Feb. 15, 2011; U.S. Appl. No. 10/846,208.
Non-Final Office Action Dated Sep. 27, 2011; U.S. Appl. No. 10/846,208.
Final Office Action Dated Sep. 22, 2009; U.S. Appl. No. 10/845,986.
Non-Final Office Action Dated Mar. 9, 2010; U.S. Appl. No. 10/845,986.
Final Office Action Dated Sep. 28, 2010; U.S. Appl. No. 10/845,986.
Non-Final Office Action Dated May 9, 2011; U.S. Appl. No. 10/845,986.
Non-Final Office Action Dated Aug. 21, 2009; U.S. Appl. No. 10/845,664.
Non-Final Office Action Dated Jun. 11, 2010; U.S. Appl. No. 10/845,664.
Final Office Action Dated Feb. 1, 2011; U.S. Appl. No. 10/845,664.
Notice of Allowance Dated Aug. 4, 2011; U.S. Appl. No. 10/845,664.
Non-Final Office Action Dated Dec. 29, 2009; U.S. Appl. No. 10/845,662.
Final Office Action Dated Sep. 7, 2010; U.S. Appl. No. 10/845,662.
Non-Final Office Action Dated Apr. 22, 2011; U.S. Appl. No. 10/845,662.
Non-Final Office Action Dated Jan. 8, 2010; U.S. Appl. No. 10/846,192.
Final Office Action Dated Sep. 7, 2010; U.S. Appl. No. 10/846,192.
Non-Final Office Action Dated Apr. 26, 2011; U.S. Appl. No. 10/846,192.
Wolfe A, et al., "A Superscalar 3D graphics engine", MICRO-32. Proceedings of the 32nd annual ACM/IEEE International Symposium on Microarchitecture. Haifa, Israel, Nov. 16-18, 1999; (1250EP).
Zaharieva-Stoyanova E I: "Data-flow analysis in superscalar computer architecture execution," Tellecommunications in Modern Satellite, Cable and Broadcasting Services, 2003 (1250EP).
The Free Online Dictionary, Thesaurus and Encyclopedia, definition for cache; http://www.thefreedictionary.com/cache; retrieved Aug. 17, 2012.
"Interleaved Memory." Dec. 26, 2002. http://www.webopedia.com/TERM/I/interleaved_memory.html.
Pirazzi, Chris. "Fields, F1/F2, Interleave, Field Dominance and More." Nov. 4, 2001. http://lurkertech.com/lg/dominance.html.
Hennessy, et al., Computer Organization and Design: The Hardware/Software Interface, 1997, Section 6.5.
Moller, et al.; Real-Time Rendering, 2nd ed., 2002, A K Peters Ltd., pp. 92-99, 2002.
Hollasch; IEEE Standard 754 Floating Point Numbers; http://steve.hollasch.net/cgindex/coding/ieeefloat.html; dated Feb. 24, 2005; retrieved Oct. 21, 2010.
Microsoft; (Complete) Tutorial to Understand IEEE Floating-Point Errors; http://support.microsoft.com/kb/42980; dated Aug. 16, 2005; retrieved Oct. 21, 2010.
Final Office Action Dated Apr. 22, 2013; U.S. Appl. No. 10/846,208.
Final Office Action Dated Dec. 30, 2011; U.S. Appl. No. 10/845,662.
Office Action Dated Aug. 28, 2012; U.S. Appl. No. 10/845,662.
Notice of Allowance Dated Mar. 1, 2013; U.S. Appl. No. 10/845,664.
Notice of Allowance Dated Jul. 17, 2013; U.S. Appl. No. 10/845,664.
Final Office Action Dated Mar. 27, 2013; U.S. Appl. No. 10/845,662.
Notice of Allowance Dated Aug. 22, 2013; U.S. Appl. No. 10/845,662.
Notice of Allowance Dated Jan. 28, 2013; U.S. Appl. No. 11/592,790.
Office Action Dated Apr. 22, 2013; U.S. Appl. No. 12/002,732.
Office Action Dated Sep. 21, 2010; U.S. Appl. No. 11/893,620.
Final Office Action Dated Feb. 14, 2011; U.S. Appl. No. 11/893,620.
Final Office Action Dated Jun. 22, 2011; U.S. Appl. No. 11/893,620.
Office Action Dated Mar. 27, 2012; U.S. Appl. No. 11/893,620.
Final Office Action Dated Jul. 18, 2012; U.S. Appl. No. 11/893,620.
Examiner'S Answer Dated Jan. 11, 2013; U.S. Appl. No. 11/893,620.
Notice of Allowance Dated Jan. 30, 2013; U.S. Appl. No. 10/845,986.
Notice of Allowance Dated Jun. 21, 2013; U.S. Appl. No. 10/845,986.
Final Office Action Dated Apr. 20, 2012; U.S. Appl. No. 10/846,208.
Office Action Dated Sep. 10, 2012; U.S. Appl. No. 10/846,208.
Office Action Dated Apr. 22, 2013; U.S. Appl. No. 10/846,208.
Notice of Allowance Dated Jan. 6, 2012; U.S. Appl. No. 10/845,986.
Notice of Allowance Dated Apr. 25, 2012; U.S. Appl. No. 10/845,986.

(56) References Cited

OTHER PUBLICATIONS

Notice of Allowance Dated Aug. 1, 2012; U.S. Appl. No. 10/845,986.
Notice of Allowance Dated Oct. 9, 2012; U.S. Appl. No. 10/845,986.
Notice of Allowance Dated Nov. 21, 2011; U.S. Appl. No. 10/845,664.
Notice of Allowance Dated Feb. 27, 2012; U.S. Appl. No. 10/845,664.
Notice of Allowance Dated Jun. 19, 2012; U.S. Appl. No. 10/845,664.
Notice of Allowance Dated Dec. 1, 2011; U.S. Appl. No. 10/846,192.
Notice of Allowance Dated Mar. 15, 2012; U.S. Appl. No. 10/846,192.
Notice of Allowance Dated Jul. 12, 2012; U.S. Appl. No. 10/846,192.
Notice of Allowance Dated Oct. 22, 2012; U.S. Appl. No. 10/846,192.
Notice of Allowance Dated Jan. 30, 2013; U.S. Appl. No. 10/846,192.
Notice of Allowance Dated Jul. 5, 2013; U.S. Appl. No. 10/846,192.
Office Action Dated Apr. 13, 2009; U.S. Appl. No. 11/592,790.
Office Action Dated Dec. 11, 2009; U.S. Appl. No. 11/592,790.
Office Action Dated May 17, 2010; U.S. Appl. No. 11/592,790.
Office Action Dated Jan. 25, 2011; U.S. Appl. No. 11/592,790.
Office Action Dated Jul. 15, 2011; U.S. Appl. No. 11/592,790.
Notice of Allowance Dated Mar. 30, 2012; U.S. Appl. No. 11/592,790.
Notice of Allowance Dated Jul. 16, 2012; U.S. Appl. No. 11/592,790.
Notice of Allowance Dated Oct. 24, 2012; U.S. Appl. No. 11/592,790.

* cited by examiner

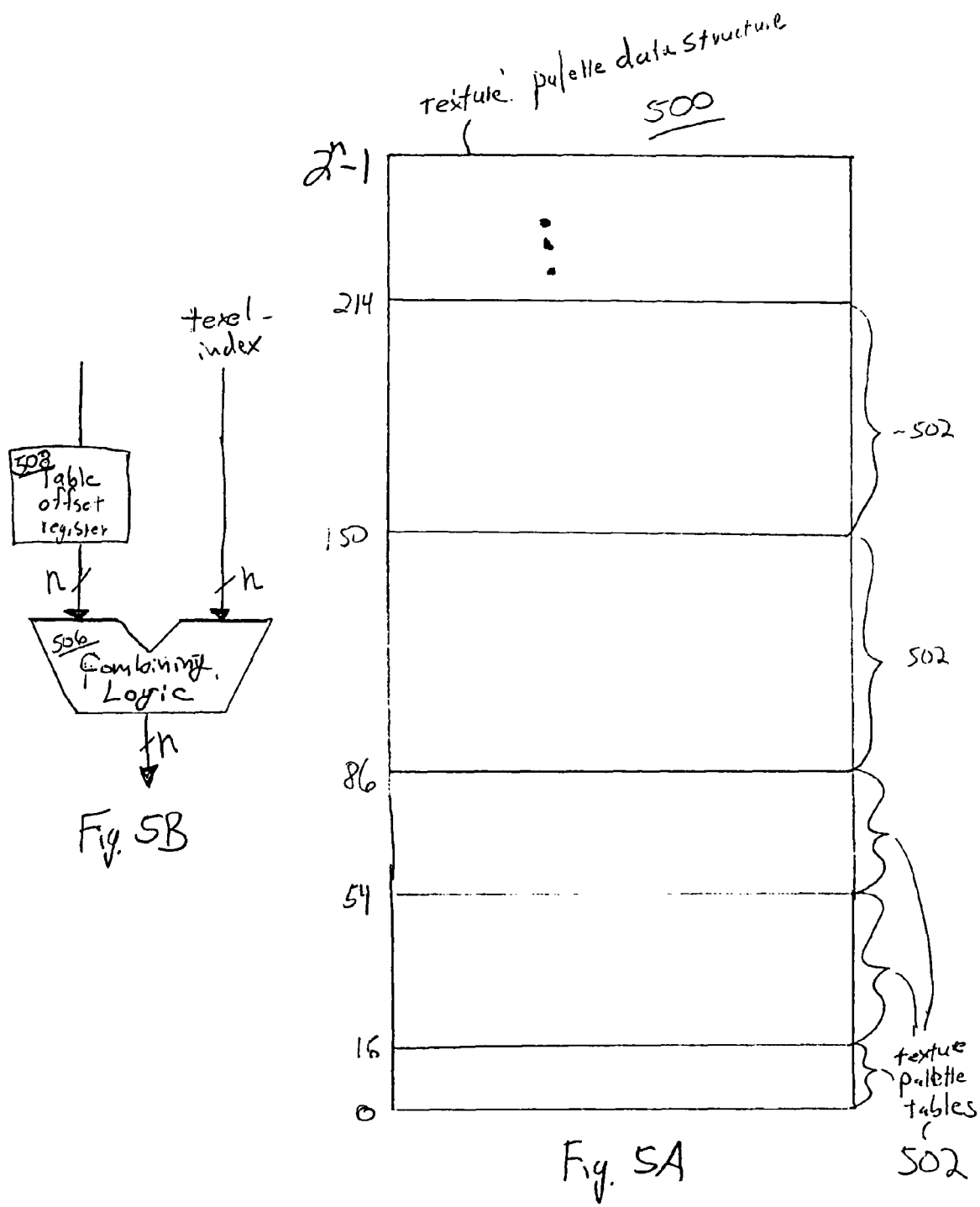

KILL BIT GRAPHICS PROCESSING SYSTEM AND METHOD

CROSS REFERENCE TO RELATED APPLICATIONS

This case is related to the following copending commonly assigned U.S. patent applications entitled:

"A Coincident Graphics Pixel Scoreboard Tracking System and Method" Ser. No. 10/846,208;

"A Unified Data Fetch Graphics Processing System and Method" Ser. No. 10/845,986;

"Arbitrary Size Texture Palletes for Use in Graphics Systems" by Battle et al. Ser. No. 10/845,664;

"Early Kill Removal Graphics Processing System and Method" Ser. No. 10/845,662; and "A Single Thread Graphics Processing System and Method" Ser. No. 10/846,192;

which are incorporated herein by reference.

FIELD OF THE INVENTION

The present invention relates to the field of graphics processing.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Electronic systems designed to produce these results usually involve interfacing with a user and the interfacing often involves presentation of graphical images to the user. Displaying graphics images traditionally involves intensive data processing and coordination requiring considerable resources and often consuming significant power.

An image is typically represented as a raster (an array) of logical picture elements (pixels). Pixel data corresponding to certain surface attributes of an image (e.g. color, depth, texture, etc.) are assigned to each pixel and the pixel data determines the nature of the projection on a display screen area associated with the logical pixel. Conventional three dimensional graphics processors typically involve extensive and numerous sequential stages or "pipeline" type processes that manipulate the pixel data in accordance with various vertex parameter values and instructions to map a three dimensional scene in the world coordinate system to a two dimensional projection (e.g., on a display screen) of an image. A relatively significant amount of processing and memory resources are usually required to implement the numerous stages of a traditional pipeline.

A number of new categories of devices (e.g., such as portable game consoles, portable wireless communication devices, portable computer systems, etc.) are emerging where size and power consumption are a significant concern. Many of these devices are small enough to be held in the hands of a user making them very convenient and the display capabilities of the devices are becoming increasingly important as the underlying fundamental potential of other activities (e.g., communications, game applications, internet applications, etc.) are increasing. However, the resources (e.g., processing capability, storage resources, etc.) of a number of the devices and systems are usually relatively limited. These limitations can make retrieving, coordinating and manipulating information associated with a final image rendered or presented on a display very difficult or even impossible. In addition, traditional graphics information processing can consume significant power and be a significant drain on limited power supplies, such as a battery.

SUMMARY

Embodiments of the present invention pixel processing system and method provide convenient and efficient processing of pixel information. Embodiments of a present invention pixel processing system and method permit complicated three dimensional images to be rendered with shallow graphics pipelines including reduced gate counts. The present invention also facilitates power conservation by not clocking logic components for pixel packet payloads associated with pixels that do not contribute to an image display presentation (e.g., pixels that are occluded).

In one embodiment pixel packet information is received at a pipestage of the processor. For example, receiving pixel packet information includes retrieving pixel surface attribute values in a single unified data fetch stage. A determination is made if the pixel packet information contributes to an image display presentation. For example, an analysis is performed to if a pixel associated with the pixel packet information is occluded (e.g., a depth comparison of Z values is performed). A pixel packet status indicator (e.g., a kill bit) is associated with the pixel packet information (e.g., set in the sideband portion of a pixel packet). The status indicator indicates the result of the occlusion test (e.g., if the pixel packet information contributes to the image display presentation). In one embodiment, an arbitrary logical operation determines the status of the status indicator (e.g., status of a kill bit). A portion of the pixel packet may be forwarded to downstream pipestages for processing in accordance with the pixel packet status indicator.

In one embodiment, the status indicator is a kill bit included in sideband data of a pixel packet and is set to prevent logic components from clocking information in a payload portion (e.g., data portion) of the pixel packet payload if the status indicator indicates the pixel packet payload does not contribute to the image display presentation while continuing to clock pixel packet sideband information. For example, the status indicator is set to enable logic components if the status indicator indicates the pixel packet information does contribute to the image display presentation and not enable logic components if the status indicator indicates the pixel packet information does contribute to the image display presentation. The status indicator can be used as a clock enable such that pipeline clocking can be turned off in specific pipeline modules regarding the payload portion of a killed pixel. Turning off clocking in such a way reduces power consumption for killed pixels.

In one exemplary implementation the pixel packet information is included in a plurality of pixel packet rows (which may make up the packet) and a status indicator coordination process is performed to coordinate a plurality of status indicators respectively associated with each one of the plurality of pixel packet rows. For example, each of the plurality of status indicators are set to indicate corresponding pixel packet rows do not contribute to the image display presentation if any one of the plurality of status indicators associated with a pixel indicates the pixel does not contribute to image display presentation. In effect, this is a type of kill bit propagation among rows of a packet.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 5A illustrates a diagram of an exemplary data structure comprising texture palette tables of arbitrary size, in accordance with an embodiment of the present invention.

FIG. 5B illustrates a diagram of exemplary logic for generating an index to access texel data in texture palette tables of arbitrary size, in accordance with an embodiment of the present invention.

FIG. 7B illustrates a diagram of an exemplary bit mask of a scoreboard stage, in accordance with an embodiment of the present invention.

DETAILED DESCRIPTION

Figure 1A:
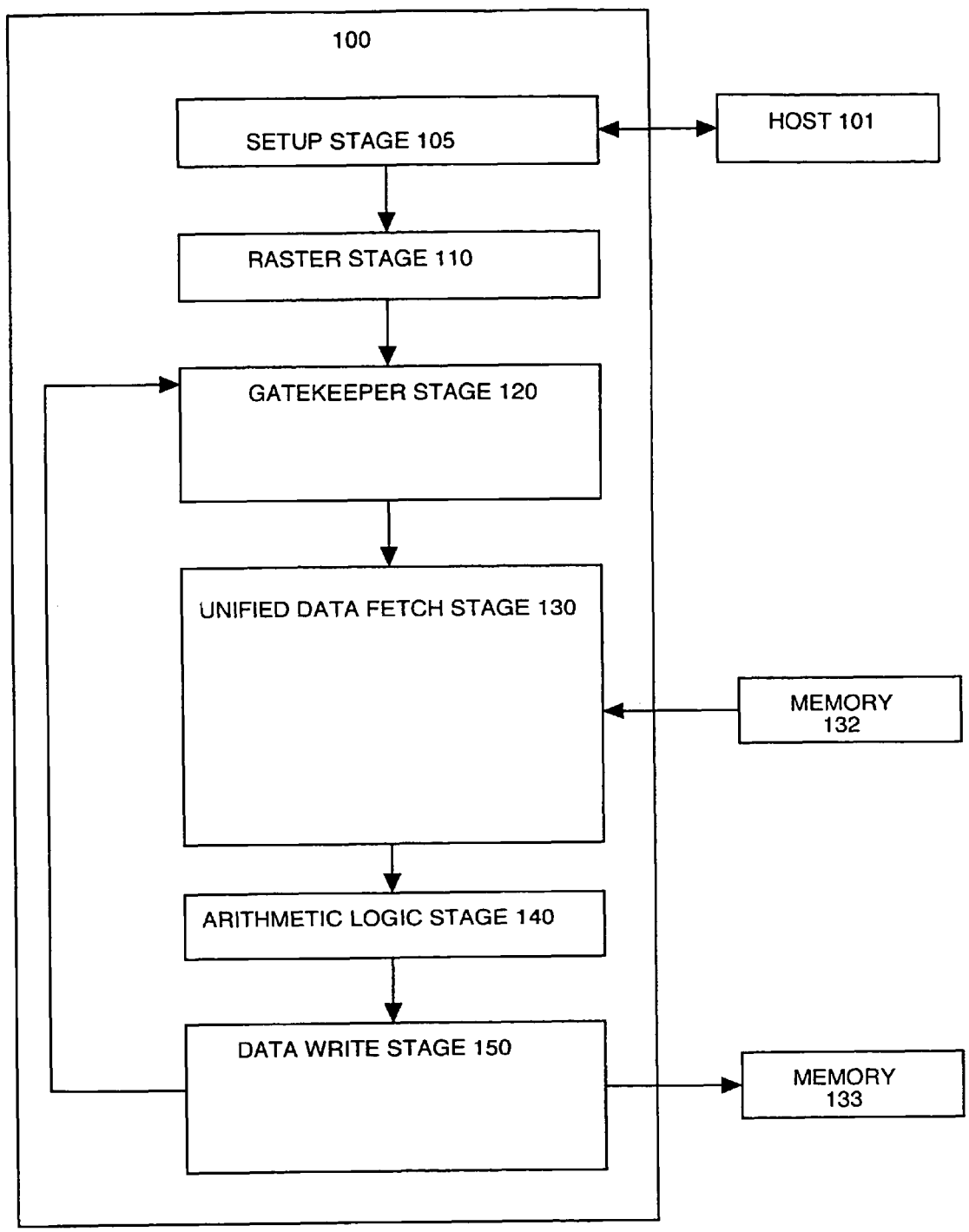
FIG. 1A is a block diagram of an exemplary graphics pipeline in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, logic, other such information storage, transmission or display devices, etc.) into other data similarly represented as physical quantities within other components.

The present invention provides efficient and convenient graphics data organization and processing. A present invention graphics system and method can facilitate presentation of graphics images with a reduced amount of resources dedicated to graphics information processing and can also facilitate increased power conservation. In one embodiment of the present invention, retrieval of graphics information is simplified. For example, several types of pixel data (e.g., color, texture, depth, etc.) can be fetched in a single unified stage and can also be forwarded for processing as a single thread. A present invention graphics system and method can also promote coordination of graphics information between different pixels. For example, if pixel data information included in a pixel packet payload does not impact (e.g., contributes to, modifies, etc.) the image display presentation, power dissipated processing the information is minimized by "killng" the pixel (e.g., not clocking the pixel packet payload through the graphics pipeline). Alternatively, the pixel packet can be removed from the graphics pipeline all together. Information retrieval can also be coordinated to ensure proper (e.g., fresh) information is being retrieved and forwarded in the proper sequence (e.g., to avoid read-modify-write problems). In addition, embodiments of the present invention can provide flexible organization of graphics information. For example, a present invention programmably configurable texture palette permits efficient and flexible implementation of diverse texture tables for texture mapping operations.

FIG. 1A is a block diagram of an exemplary graphics pipeline 100 in accordance with one embodiment of the present invention. Graphics pipeline 100 facilitates efficient and effective utilization of processing resources. In one embodiment, graphics pipeline 100 processes graphics information in an organized and coordinated manner. Graphics pipeline 100 can implemented as a graphics processing core in a variety of different components (e.g., in a graphics processing chip, in an application specific integrated circuit, a central processing unit, integrated in a host processing unit, etc.). Various aspects graphics pipeline 100 and other embodiments of the present invention are described in portions of the following description as operating upon graphics primitives, (e.g., triangles) as a matter of convenient convention. It is appreciated that the present invention is readily adaptable and can be also implemented utilizing a variety of other geometrical primitives.

Graphics pipeline 100 includes setup stage 105, raster stage 110, gatekeeper stage 120, unified data fetch sage 130, arithmetic logic unit stage 140 and data write stage 150. In one embodiment of the present invention, a host (e.g., host 101) provides graphics pipeline 100 with vertex data (e.g., points in three dimensional space that are being rendered), commands for rendering particular triangles given the vertex data, and programming information for the pipeline (e.g., register writes for loading instructions into different graphics pipeline 100 stages). The stages of graphics pipeline 100 cooperatively operate to process graphics information.

Setup stage 105 receives vertex data and prepares information for processing in graphics pipeline 100. Setup stage 105 can perform geometrical transformation of coordinates, perform view port transforms, perform clipping and prepare perspective correct parameters for use in raster stage 110, including parameter coefficients. In one embodiment, the setup unit applies a user defined view transform to vertex information (e.g., x, y, z, color and/or texture attributes, etc.) and determines screen space coordinates for each triangle. Setup stage 105 can also support guard-band dipping, culling of back facing triangles (e.g., triangles facing away from a viewer), and determining interpolated texture level of detail (e.g., level of detail based upon triangle level rather than pixel level). In addition, setup stage 105 can collect statistics and debug information from other graphics processing blocks. Setup stage 105 can include a vertex buffer (e.g., vertex cache) that can be programmably controlled (e.g., by software, a driver, etc.) to efficiently utilize resources (e.g., for different bit size word vertex formats). For example, transformed vertex data can be tracked and saved in the vertex buffer for future use without having to perform transform operations for the same vertex again. In one embodiment, setup stage 105 sets up barycentric coefficients for raster 110. In one exemplary implementation, setup stage 105 is a floating point Very Large Instruction Word (VLIW) machine that supports 32-bit IEEE float, S15.16 fixed point and packed 0.8 fixed point formats.

Raster stage 110 determines which pixels correspond to a particular triangle and interpolates parameters from setup stage 105 associated with the triangle to provide a set of interpolated parameter variables and instruction pointers or sequence numbers associated with (e.g., describing) each pixel. For example, raster stage 100 can provide a "translation" or rasterization from a triangle view to a pixel view of an image. In one embodiment, raster stage 110 scans or iterates each pixel in an intersection of a triangle and a scissor rectangle. For example, raster stage 110 can process pixels of a given triangle and determine which processing operations are appropriate for pixel rendering (e.g., operations related to color, texture, depth and fog, etc.). Raster stage 110 can support guard band (e.g., +/−1K) coordinates providing efficient guard-band rasterization of on-screen pixels and facilitates reduction of clipping operations. In one exemplary implementation, raster stage 110 is compatible with Open GL-ES and D3DM rasterization rules. Raster stage 110 is also programmable to facilitate reduction of power that would otherwise be consumed by unused features and faster rendering of simple drawing tasks, as compared to a hard-coded rasterizer unit in which features consume time or power (or both) whether or not they are being used.

Raster stage 110 also generates pixel packets utilized in graphics pipeline 100. Each pixel packet includes one or more rows and each row includes a payload portion and a sideband portion. A payload portion includes fields for various values including interpolated parameter values (e.g., values that are the result of raster interpolation operations). For example, the fields can be created to hold values associated with pixel surface attributes (e.g., color, texture, depth, fog, (x,y) location, etc.). Instruction sequence numbers associated with the pixel processing are assigned to the pixel packets and placed in an instruction sequence field of the sideband portion. The sideband information also includes a status field (e.g., kill field).

Figure 1B:
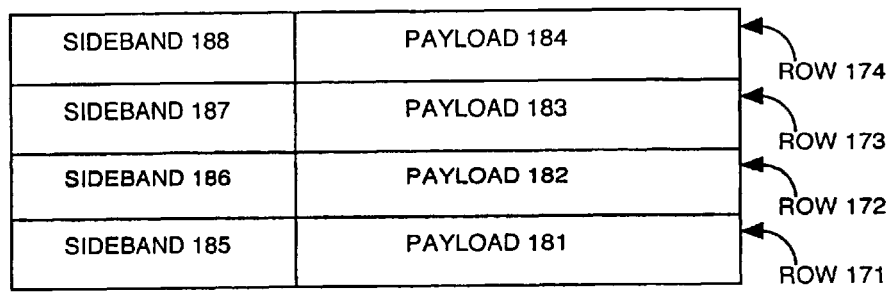
FIG. 1B is a block diagram of an exemplary pixel packet in accordance with one embodiment of the present invention.
Figure 1C:
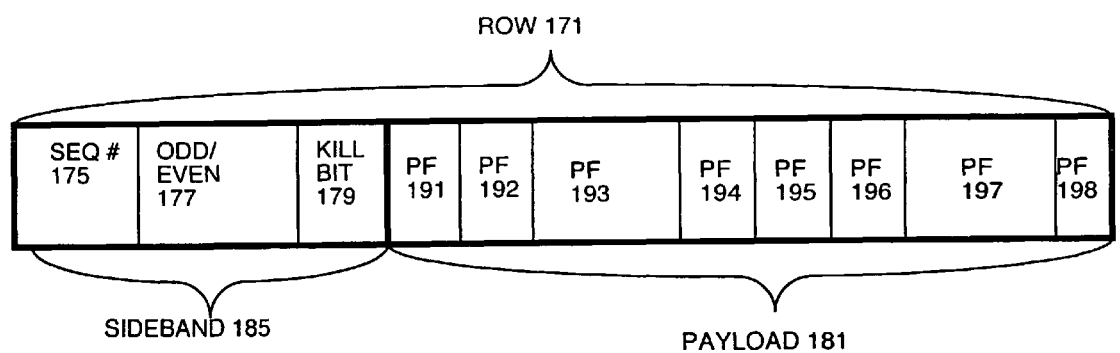
FIG. 1C is a block diagram of an exemplary pixel packet row in accordance with one embodiment of the present invention.

FIG. 1B is a block diagram of pixel packet 170 in accordance with one embodiment of the present invention. Pixel packet 170 includes rows 171 through 174, although a pixel packet may include more or less rows (e.g., a pixel packet may include only one row). Each row 171 through 174 includes a payload portion 181 through 184 respectively and a sideband portion 185 through 188 respectively. Each payload portion includes a plurality of interpolated parameter value fields and locations for storing other data. Each sideband portion may include a sequence number, an odd/even indictor and a status indicator (e.g., kill bit indicator). FIG. 1C is a block diagram of an exemplary pixel packet row 171 in accordance with one embodiment of the present invention. Exemplary pixel packet row 171 payload portion 181 includes fields 191 through 198. The size of the fields and the contents can vary. In one exemplary implementation, a raster stage can produce up to four high precision and four low precision perspective correct interpolated parameter variable values (e.g., associated with the results of 8 different types of parameter interpolations) and a depth indication (e.g., Z indication). The high precision and low precision perspective correct interpolated parameter variable values and depth indication produced by the raster stage can be included in pixel packet rows. Exemplary pixel packet row 171 sideband portion 185 may include sequence number field 175, an odd/even indictor field 177 and kill bit indicator field 179. In one embodiment, the payload portion may be 80 bits wide.

Figure 1:
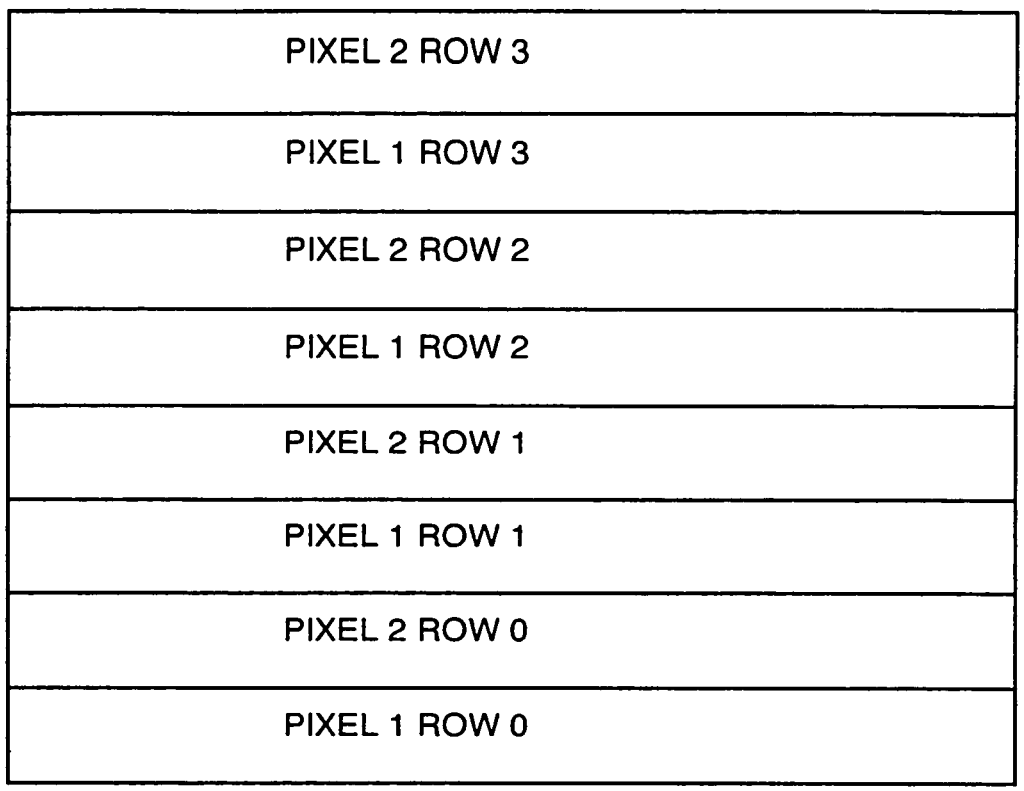
FIG. 1D is a block diagram of interleaved pixel packet rows in accordance with one embodiment of the present invention.

In one embodiment, raster stage 110 calculates barycentic coordinates for pixel packets. In a barycentric coordinate system, distances in a triangle are measured with respect to its vertices. The use of barycentric coordinates reduces the required dynamic range, which permits using fixed point calculations that require less power than floating point calculations. In one embodiment, raster stage 110 can also interleave even number pixel rows and odd number pixel rows to account for multiclock cycle latencies of downstream pipestages. In one exemplary implementation, a downstream ALU stage can compute something from row N, save the result to a temporary register and row N+1 of the same pixel can reference the value in the temporary register. In an implementation in which the latency of the ALU is two clock cycles, the work is interleaved so that by the time row N+1 of a pixel is processed, two clocks have gone by and the results of row N are finished. FIG. 1 D is a block diagram of interleaved pixel packet rows in accordance with one embodiment of the present invention.

Gatekeeper stage 120 of FIG. 1A regulates the flow of pixels through graphics pipeline 100. In one embodiment of the present invention, gatekeeper 120 controls pixel packet flow via counting to maintain downstream skid in the pipeline. Gatekeeper stage 120 can detect idle or stall conditions (e.g., in subsequent stages of graphics pipeline 100) and make adjustments to pixel flow to optimize pipeline resource utilization (e.g., keep pipeline full). Gatekeeper stage 120 can also support "recirculation" of pixel packets for complex pipeline operations (e.g., complex shading operations). For example, gatekeeper stage 120 can synthesize a span start to track re-circulated coordinate (X,Y) positions. In one exemplary implementation, gatekeeper 120 also collects debug readback information from other graphics pipeline 100 stages (e.g., can handle debug register reads).

In one embodiment of the present invention, gatekeeper stage 120 facilitates data coherency maintenance for data-fetch stage 130 (e.g., in data in fetch buffer 131) and data write stage 150 (e.g., data in write buffer 141). For example, gatekeeper stage 120 can prevent read-modify-write hazards by coordinating entrance of coincident pixels into subsequent stages of graphics pipeline 100 with on going read-modify-write operations. In one exemplary implementation, gatekeeper stage 120 utilizes score boarding techniques to track and identify coincident pixel issues. Gatekeeper stage 120 also tracks pixels that finish processing through the pipeline (e.g., by being written to memory or being killed).

Unified data fetch stage 130 is responsible for fetching (e.g., reading) a plurality of different data types (e.g., color data, depth data, texture data, etc.) from a memory (e.g., memory 132) in a single stage. In one embodiment, unified data fetch 130 retrieves pixel surface attribute values associated with pixel information and instructions received from raster stage 110 (e.g., in a pixel packet row payload portion). The single unified data fetch stage can include a variety of different pathway configurations for retrieving the pixel surface attribute values. For example, unified data fetch stage 130 can include separate pathways and caches (not shown) for texture color and depth (e.g., z value). Unified data fetch stage 130 places the surface attribute values in the corresponding variable fields of the pixel packet payload portion and forwards the resultant pixel packet row including the surface attribute values to other stages of graphics pipeline 100 (e.g., ALU stage 140). In one embodiment of the present invention, the pixel packets are forwarded for processing in a single thread.

In one embodiment of the present invention, unified data fetch stage 130 is capable of efficiently interacting with wide memory access bandwidth features of memory interfaces external to graphics pipeline 100. In one exemplary implementation, unified data fetch stage 130 temporarily stores information received from a memory access even though the entire bandwidth of data received is not necessary for a particular pixel. For example, information received from a memory interface is placed in a buffer (e.g., a register, a cache, etc.).

In one embodiment of the present invention, data fetch stage 130 facilitates efficient utilization of resources by limiting processing on pixels that do not contribute to an image display presentation. In one exemplary implementation, data fetch stage 130 determines if information included in a pixel packet payload impacts (e.g., contributes to, modifies, etc.) the image display presentation. For example, data fetch stage 130 analyzes if the pixel payload values indicate a pixel is occluded (e.g., via a Z-depth comparison and may set kill bits accordingly). Data fetch stage 130 can be flexibly implemented to address various power consumption and performance objectives if information included in a pixel packet payload does not contribute to the image display presentation.

In one embodiment, data fetch stage 130 associates (e.g., marks) pixel packet information with a status indicator for indicating if information included in a pixel packet does not contribute to the image display presentation and forwards the pixel packet for downstream processing in accordance with the status indicator. In one exemplary implementation, data in a sideband portion of a pixel packet is clocked through subsequent stages of pipeline regardless of a status indictor (e.g., kill bit) setting while data in a payload portion is not clocked through subsequent stages if the status indicator is set indicating the pixel packet payload does not contribute to the image display presentation. In an alternate embodiment, data fetch stage 130 may remove pixel information (e.g., pixel packet rows) associated with the pixel from the pipeline if the information does not contribute to the image display presentation and notifies gatekeeper 120. This implementation may actually increase pipeline skid and may trigger the gatekeeper 120 to allow more pixels into the pipeline.

Arithmetic logic stage 140 (e.g., an ALU) of FIG. 1A performs shading coordination operations on pixel packet row payload information (e.g., pixel surface attribute information) received from data fetch stage 130. The universal arithmetic logic stage can perform operations on pixel data to implement a variety of different functions. For example, arithmetic logic stage 140 can execute shader operations (e.g., blending and combining) related to three-dimensional graphics including texture combination (texture environment), stencil, fog, alpha blend, alpha test, and depth test. Arithmetic logic stage 140 may have multi-cyde latency per substage and therefore can perform a variety of arithmetic and/or logic operations (e.g., A*B+C*D) on the pixel surface attribute information to achieve shading coordination. In one exemplary implementation, arithmetic logic stage 140 performs operations on scalar values (e.g., a scalar value associated with pixel surface attribute information). Arithmetic logic unit 140 can perform the operations on interleaved pixel packet rows as shown in FIG. 1D which illustrates rows in a pipeline order. In addition, arithmetic logic stage 140 can be programmed to write results to a variety of pipeline registers (e.g., temporary register within the arithmetic logic stage 140) or programmed not to write results. In one embodiment, arithmetic logic stage 140 performs the operations in a single thread.

Data write stage 150 sends color and Z-depth results out to memory (e.g., memory 133). Data write stage 150 is a general purpose or universal flexibly programmable data write stage. In one embodiment data write stage 150 process pixel packet rows. In one exemplary implementation of data write stage 150 the processing includes recirculating pixel packet rows in the pipeline (e.g., sending the pixel packet row back to gatekeeper stage 120) and notifying the gatekeeper stage 120 of killed pixels.

Figure 2:
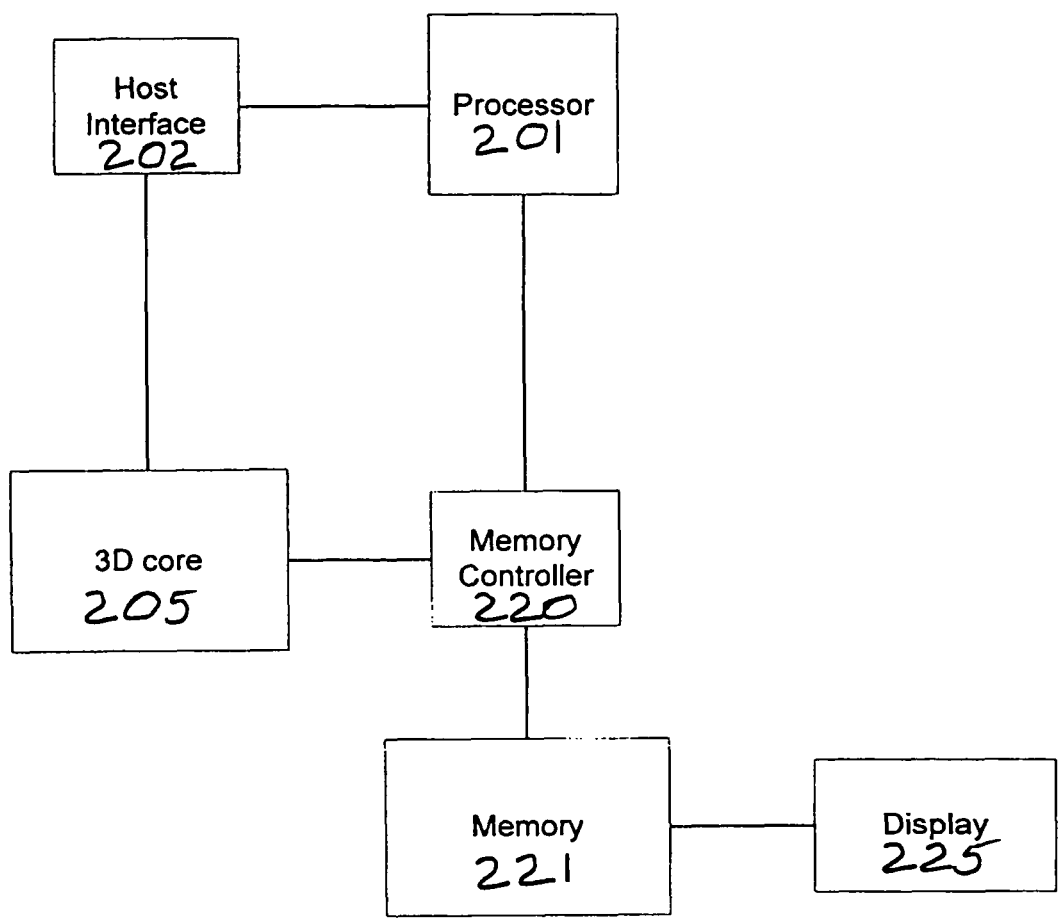
FIG. 2A is a block diagram of a computer system in accordance with one embodiment of the present invention is shown.
FIG. 2B is a block diagram of a computer system in accordance with one alternative embodiment of the present invention.

With reference now to FIG. 2A, a computer system 200 in accordance with one embodiment of the present invention is shown. Computer system 200 may provide the execution platform for implementing certain software-based functionality of the present invention. As depicted in FIG. 2, the computer system 200 includes a CPU 201 coupled to a 3-D processor 205 via a host interface 202. The host interface 202 translates data and commands passing between the CPU 201 and the 3-D processor 205 into their respective formats. Both the CPU 201 and the 3-D processor 205 are coupled to a memory 221 via a memory controller 220. In the system 200 embodiment, the memory 221 is a shared memory, which refers to the property whereby the memory 221 stores instructions and data for both the CPU 201 and the 3-D processor 205. Access to the shared memory 221 is through the memory controller 220. The shared memory 221 also stores data comprising a video frame buffer which drives a coupled display 225.

As described above, certain processes and steps of the present invention are realized, in one embodiment, as a series of instructions (e.g., software program) that reside within computer readable memory (e.g., memory 221) of a computer system (e.g., system 200) and are executed by the CPU 201 and graphics processor 205 of system 200. When executed, the instructions cause the computer system 200 to implement the functionality of the present invention as described below.

As shown in FIG. 2A, system 200 shows the basic components of a computer system platform that may implement the functionality of the present invention. Accordingly, system 200 can be implemented as, for example, a number of different types of portable handheld electronic devices. Such devices can include, for example, portable phones, PDAs, handheld gaming devices, and the like. In such embodiments, components would be included that are designed to add peripheral buses, specialized communications components, support for specialized IO devices, and the like.

Figure 2B:
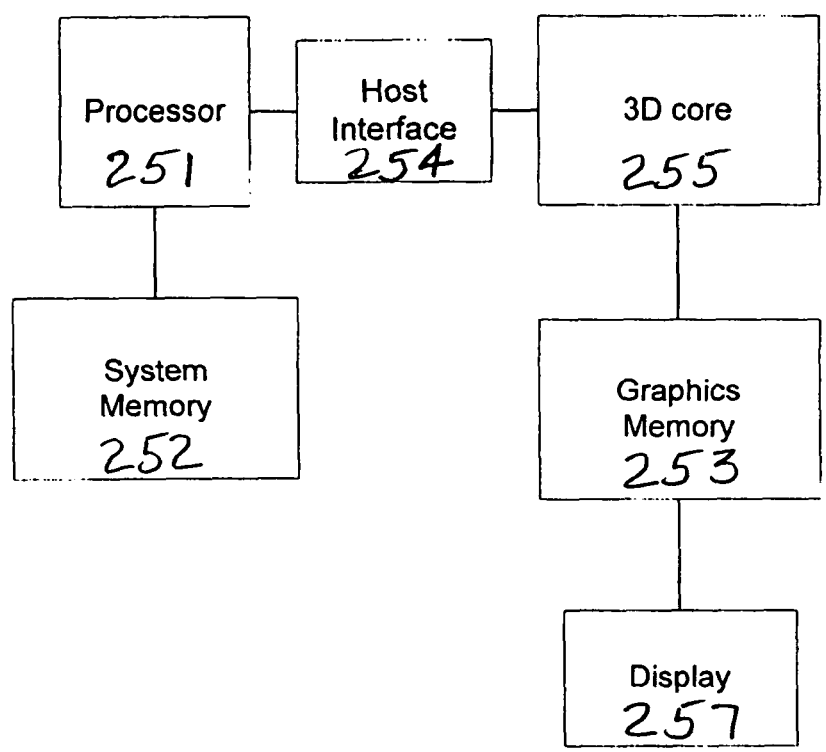

Additionally, it should be appreciated that although the components 201-257 are depicted in FIGS. 2A and 2B as a discrete components, several of the components can be implemented as a single monolithic integrated circuit device (e.g., a single integrated circuit die) configured to take advantage of the high levels of integration provided by modern semiconductor fabrication processes. For example, in one embodiment, the CPU 201, host interface 202, 3-D processor 205, and memory controller 220 are fabricated as a single integrated circuit die.

FIG. 2B shows a computer system 250 in accordance with one alternative embodiment of the present invention. Computer system 250 is substantially similar to computer system 200 of FIG. 2A. Computer system 250, however, utilizes the processor 251 having a dedicated system memory 252, and the 3-D processor 255 having a dedicated graphics memory 253. Host interface 254 translates data and commands passing between the CPU 201 and the 3-D processor 255 into their respective formats. In the system 250 embodiment, the system memory 251 stores instructions and data for processes/threads executing on the CPU 251 and graphics memory 253 stores instructions and data for those processes/threads executing on the 3-D processor 255. The graphics memory 253 stores data the video frame buffer which drives the display 257. As with computer system 200 of FIG. 2A, one or more of the components 251-253 of computer system 250 can be integrated onto a single integrated circuit die.

Figure 3A:
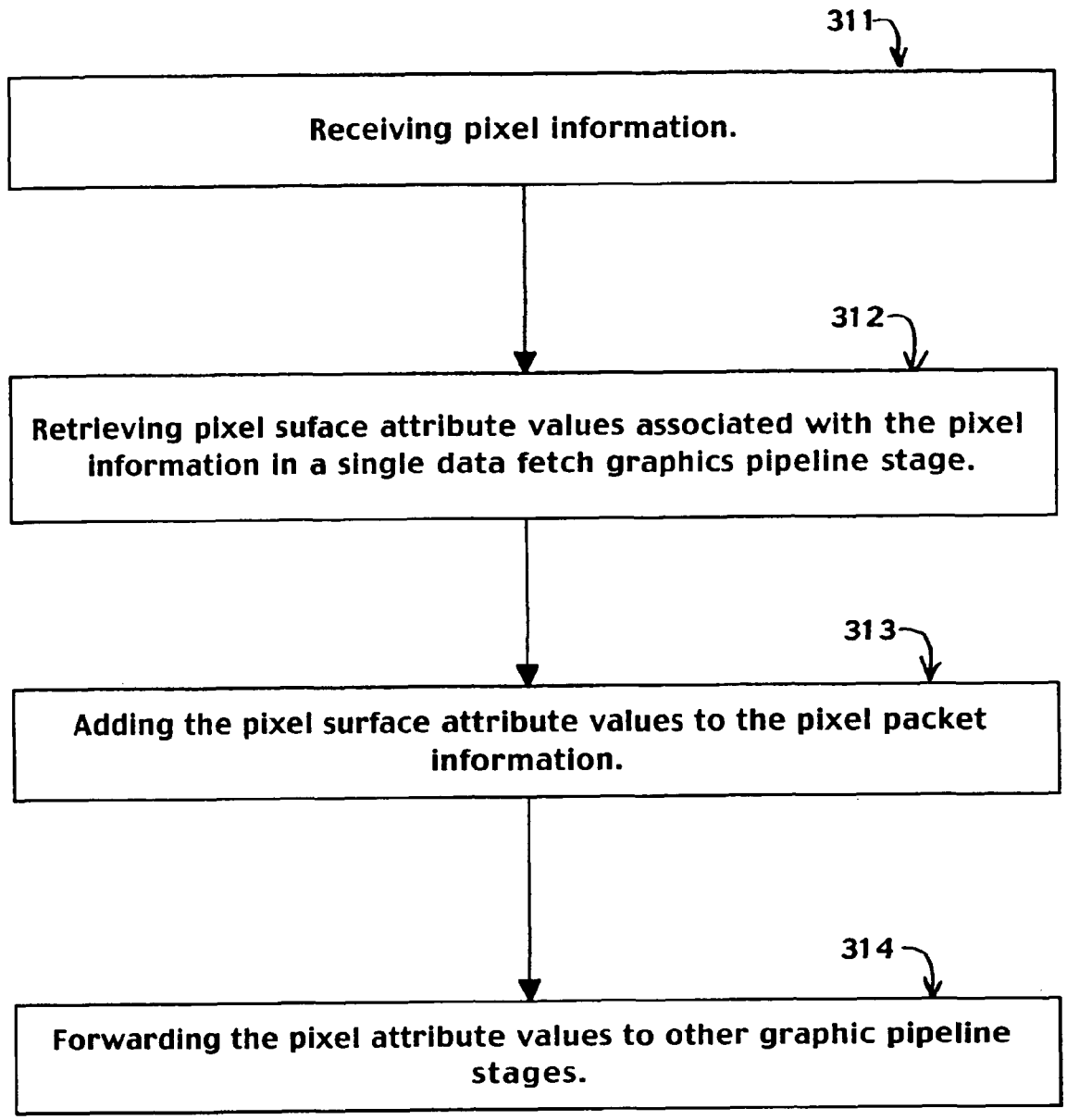
FIG. 3A is a flow chart of steps of graphics data fetch method in accordance with one embodiment of the present invention.

FIG. 3A is a flow chart of graphics data fetch method 310 in accordance with one embodiment of the data fetch pipestages of the present invention. Graphics data fetch method 310 unifies data fetching for a variety of different types of pixel information and for a variety of different graphics operations from a memory (e.g., in a single graphics pipeline stage). For example, graphics data fetch method 310 unifies data fetching of various different pixel surface attributes (e.g., data related to color, depth, texture, etc.) in a single graphics pipeline stage.

In step 311, pixel information (e.g., a pixel packet row) is received. In one embodiment, the pixel information is produced by a raster module (e.g., raster module 392 shown in FIG. 3B). In one embodiment, the pixel packet row includes a sideband portion and a payload portion including interpolated parameter variable fields. In one exemplary implementation, the pixel packet row is received from a graphics pipeline raster stage (e.g., raster stage 110) or from gatekeeper stage 120.

At step 312, pixel surface attribute values associated with the pixel information (e.g., in a pixel packet row) are retrieved or fetched in a single unified data fetch graphics pipeline stage (e.g., unified data fetch stage 130). In one embodiment, the retrieving is a unified retrieval of pixel surface attribute values servicing different types of pixel surface attribute data. For example, the pixel surface attribute values can correspond to arbitrary surface data (e.g., color, texture, depth, stencil, alpha, etc.).

Retrieval of information in data fetch method 310 can be flexibly implemented with one data fetch pathway (e.g., utilizing smaller gate counts) or multiple data fetch pathways in a single stage (e.g., for permitting greater flexibility). In one embodiment, a plurality of different types of pixel surface attribute values are retrieved via a single pathway. For example, a plurality of different types of pixel surface attribute values are retrieved as a texture. In one embodiment, surface depth attributes and surface color attributes may be incorporated and retrieved as part of a texture surface attribute value. Alternatively, the plurality of different types of pixel surface attribute values are retrieved via different corresponding dedicated pathways. For example, a pathway for color, a pathway for depth and a pathway for texture which flow into a single data fetch stage. Each pathway may have its own cache memory. In one embodiment, a texture fetch may be performed in parallel with either a color fetch (e.g., alpha blend) or a z value fetch. Alternatively, all data fetch operations (e.g., alpha, z-value, and texture) may be done in parallel)

The obtained pixel surface attribute values are inserted or added to the pixel information in step 313. For example, the pixel surface attribute values are placed in the corresponding fields of the pixel packet row. In one exemplary implementation, an instruction in the sideband portion of a pixel packet row indicates a field of a pixel packet in which the pixel surface attribute value is inserted. For example, an instruction in the sideband portion of the pixel packet can direct a retrieved color, depth or texture attribute to be placed in a particular pixel packet payload field.

In step 314, the pixel attribute values are forwarded to other graphic pipeline stages. In one exemplary implementation, an arithmetic/logic function is performed on the pixel information in subsequent graphic pipeline stages. In one embodiment, a data write function is performed on the pixel information (e.g., pixel rendering data is written in a single data write graphics pipeline stage). In one embodiment of the present invention, pixel information is recirculated subsequent to performing the arithmetic/logic function. For example, the pixel information is recirculated to unified data fetch stage 130.

Figure 3B:
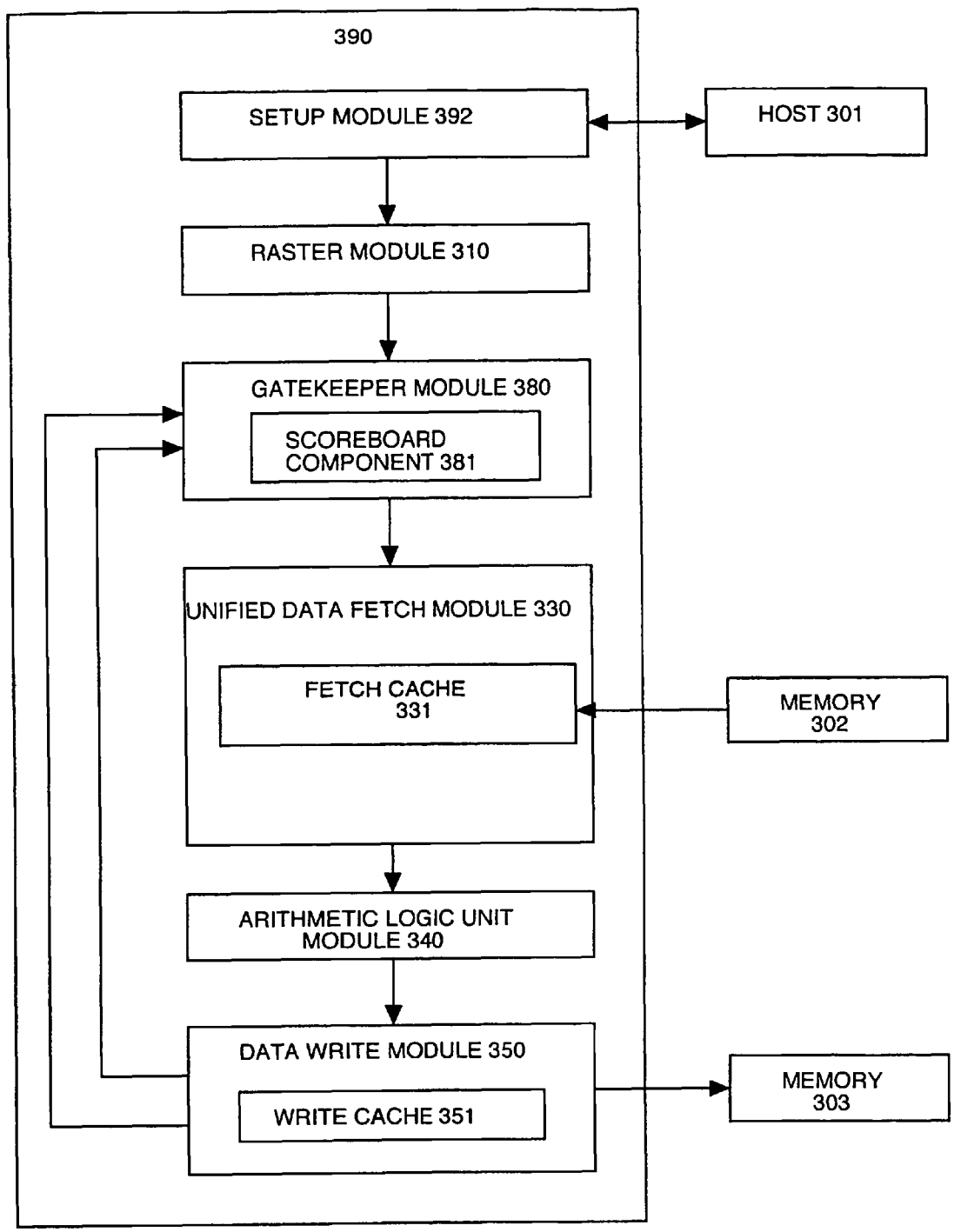
FIG. 3B is a block diagram of an exemplary unified data fetch module in accordance with one embodiment of the present invention.

FIG. 3B is a block diagram of another graphics pipeline 390 in accordance with one embodiment of the present invention. Graphics pipeline 390 includes setup module 391, raster module 392, gatekeeper module 380, unified data fetch module 330, arithmetic logic unit (ALU) module 393, and data write module 350. In one embodiment, graphics pipeline 390 may be implemented as a graphics pipeline processing core (e.g., in a graphics processing chip, in an application specific integrated circuit, a central processing unit, integrated in a host processing unit, etc.).

In one embodiment, modules of graphics pipeline 390 are utilized to implement corresponding stages of graphics pipeline 100. In one exemplary implementation, the modules of graphics pipeline 390 are hardware components included in a graphics processing unit. Setup module 392 receives information from host 301 and provides vertex and parameter information to raster module 392. Raster module 392 interpolates parameters from setup module 392 and forwards pixel packets to gatekeeper module 380. Gatekeeper module 380 controls pixel packet flow to unified data fetch stage 330. Unified data fetch module 330 retrieves a variety of different types of surface attribute information from memory 302 with unified data fetch operations in a single stage. Arithmetic logic unit 393 performs operations on pixel packet information. Data write module 350 writes pixel rendering data to memory 303 (e.g., a frame buffer).

Unified data fetch module 330 obtains surface information related to pixels (e.g., pixels generated by a rasterization module). The surface information is associated with a plurality of graphics functions to be performed on the pixels and wherein the surface information is stored in pixel information (e.g., a pixel packet) associated with the pixels. The plurality of graphics functions can include color blending and texture mapping. In one embodiment of the present invention, unified data fetch module 330 implements a unified data fetch stage (e.g., unified data fetch stage 130).

In one embodiment, a plurality of unified data fetch modules are included in a single unified data fetch stage. The plurality of unified data fetch modules facilitates flexibility in component configuration (e.g., multiple texture fetch modules) and data retrieval operations. In one exemplary implementation, pixel packet information (e.g., pixel packet rows) can be routed to a plurality of different subsequent graphics pipeline resources. For example, a switch between unified data fetch module 330 can route pixels to a variety of ALU components within arithmetic logic unit module 340.

In one embodiment of the present invention, unified data fetch module 330 is capable of efficiently interacting with wide memory access bandwidth features of memory interfaces (e.g., memory 302) external to graphics pipeline 390. In one exemplary implementation, unified data fetch stage 330 temporarily stores information (e.g., in fetch cache 331) received from a memory access even though the entire bandwidth of data received (e.g., 128 bits wide) is not necessary for a particular pixel (e.g., data 16 bits wide). The excess data in the access bandwidth may contain data related to other imminent operations. For example, subsequent pixels are usually dose to one another spatially (e.g., other pixel rending in the for the same triangle) and surface attribute data for the other pixels is often included in a memory access return because the surface attributes are usually stored in locations dose to one another in the external memory. Thus, unified data fetch module 330 can include features to efficiently utilize memory access bandwidth by temporarily caching the memory access information in case a subsequent operation needs the information.

Figure 3C:
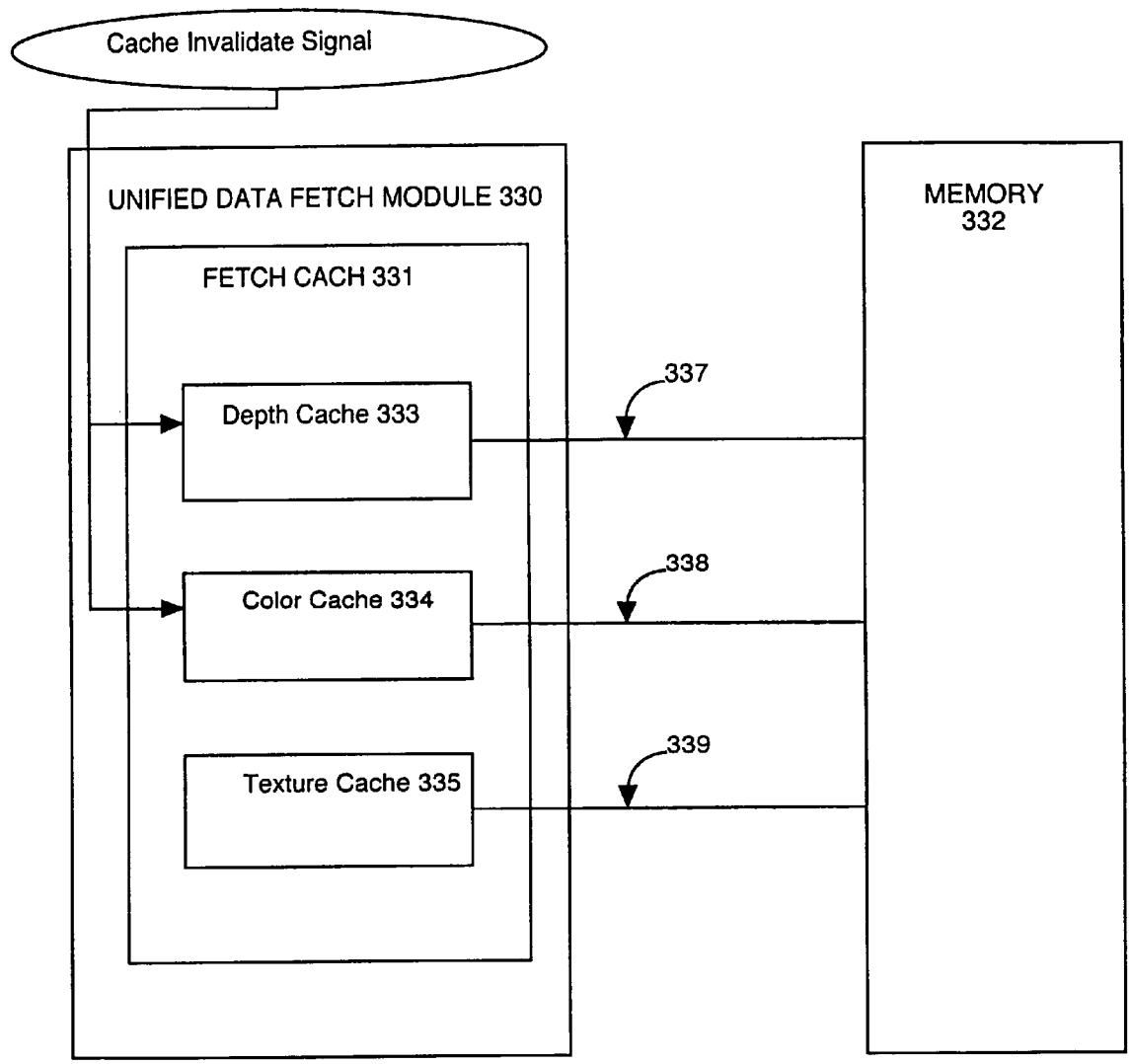
FIG. 3C is a block diagram of one exemplary implementation of a unified data fetch module with multiple fetch pathways in accordance with one embodiment of the present invention.

It is appreciated that unified data fetch module 330 can be implemented in a variety of embodiments. In one embodiment, data fetch module 330 includes a plurality of pathways for obtaining the information. FIG. 3C is a block diagram of one exemplary implementation of unified data fetch module 330 with multiple fetch pathways. For example, data fetch module 330 can be implemented with texture pathway 339 including respective texture cache 335, color pathway 338 including respective color cache 334, and depth pathway 337 including respective depth cache 333. In an alternate embodiment, data fetch module 330 includes a single fetch pathway (e.g., a texture pathway) with a respective texture cache. Data fetch module 330 utilizes a single texture engine to retrieve data, color and texture attributes via the single texture pathway.

Arithmetic logic unit (ALU) module 393 is communicatively coupled to receive pixel information output from unified data fetch module 370 and data write module 394 is communicatively coupled to receive pixel information output from ALU module 393. In one exemplary implementation, a recirculation data path 397 (FIG. 3B) communicatively couples data write module 394 to the unified data fetch module 397 for recirculating pixel information back to the unified data fetch module 397.

The unification of operations (e.g. on data related to a particular pixel) in a single stage in accordance with embodiments of the present invention provides a number of advantageous features. The present invention enables pixel information (e.g., instructions, surface attribute data, etc.) to be distributed across time within the pipeline by placing the information in multiple pixel packet rows and also by re-circulating requisite pixel packet rows within the pipeline. In one embodiment of the present invention, the order of processing on components of pixel packet information (e.g., a particular pixel packet row) can be dynamically changed within a present invention pipeline without altering the order of pixel processing dictated by an application. In one exemplary implementation, a similar "unified protocol" is utilized for both memory accesses and memory writes. For example, pixel rendering data for a particular pixel is similarly written in a single unified data write graphics pipeline stage. The unified data write graphics pipeline stage (e.g., implemented by data write module 351) can re-circulate information (e.g., a pixel packet row) for utilization in subsequent processing operations. For example, data write stage 150 can send information (e.g., a pixel packet row 0 back to gatekeeper stage 120).

In one embodiment of the present invention, unified data fetching also facilitates pixel packet payload processing in a single thread. In one exemplary implementation, unified data fetching of data (e.g., surface attribute values) associated with a pixel can "guarantee" the information requisite for subsequent pixel processing is available for single thread processing. Single thread processing in accordance with the present invention reduces problems associated with different components of pixel information being brought into a graphics pipeline at different times. For example, single thread processing in accordance with the present invention simplifies resource management issues for arithmetic logic operations since the fetched data is available from a single unified data fetch stage to the arithmetic logic stage.

As shown in FIG. 3C, a cache invalidate signal can be used to invalidate both cache 333 and/or the color cache 334.

Figure 3D:
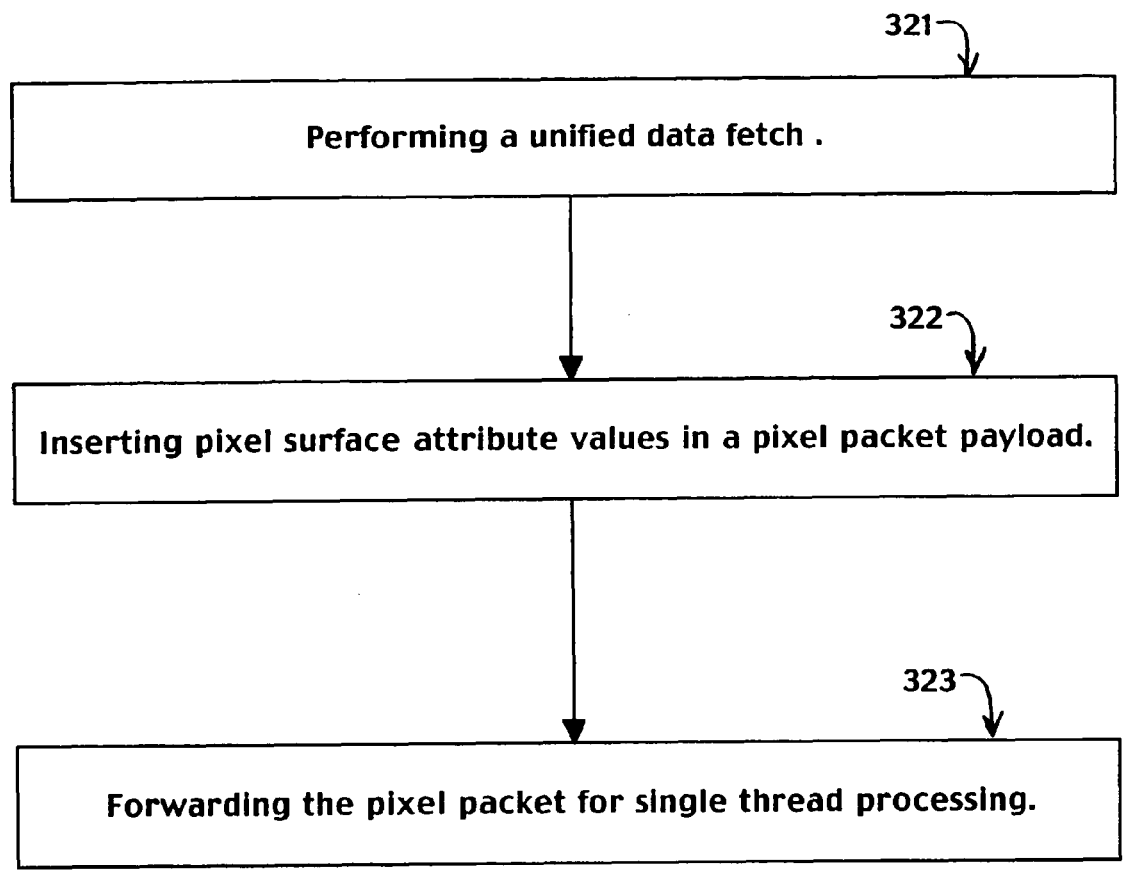
FIG. 3D is a flow chart of steps in an exemplary pixel processing method for processing information in a single thread in accordance with one embodiment of the present invention.

FIG. 3D is a flow chart of pixel processing method 320 for processing information in a single thread in accordance with one embodiment of the present invention.

In step 321, a unified data fetch of pixel surface attribute values is performed in a single stage of a graphics pipeline. For example, different types of pixel surface attribute values are fetched when performing the unified data fetch. In one embodiment, a plurality of data for a respective pixel is fetched in parallel. The plurality of data is associated with multiple graphics functions to be performed on the pixel. For example, the plurality of data can include texture information and color information and the multiple graphics functions can include a texture mapping function and a color blending function. The multiple data can also include depth information. In one embodiment, a respective pixel passes through the data fetch stage once to obtain all data required by arithmetic logic stage regarding the respective pixel.

In step 322, the pixel surface attribute values are inserted in a pixel packet payload. The pixel surface attribute values can correspond to different attributes of a surface, including depth, color, texture, stencil and alpha pixel attribute values.

In step 323, the pixel packet payload is forwarded for single thread processing. The single thread processing operates on the different types of pixel surface attribute values in a single thread. In one embodiment, a plurality of data is included in the pixel packet and is supplied to subsequent stages (e.g., an arithmetic logic stage) of a graphics pipeline and the multiple functions are performed on the plurality of data. An arithmetic logic stage can perform the plurality of graphics functions in an arbitrary order according to software control.

A present invention graphics pipeline system and method can facilitate efficient utilization of resources by limiting processing on pixels that do not contribute to an image display presentation. In one exemplary implementation, a data fetch stage (e.g., data fetch stage 130) can be flexibly implemented to address various power consumption and performance objectives if information included in a pixel packet does not contribute to the image display presentation. Unification of data fetching permits a variety of different analysis to determine relatively "early" in the graphics pipeline if a pixel contributes to the image display presentation. For example, an analysis of whether a pixel is occluded (e.g., has values associated with "hidden" surfaces that do not contribute to an image display presentation) is performed relatively early at the unified data fetch stage. The present invention can prevent power being consumed on processing for pixels that would otherwise be discarded at the end of the pipeline.

The handling of pixels that are identified as not contributing to the image display presentation can be flexibly implemented to address various power consumption and performance objectives if information included in a pixel packet payload does not contribute to the image display presentation. In one embodiment, a sideband portion of a row of a pixel packet is forwarded through subsequent stages of a graphics pipeline but a payload portion of the pixel packet row is not docked through (e.g., CMOS components for the payload portion do not switch) for killed pixels. This permits power that would otherwise be consumed on the payload portion to be conserved and the sideband information flows through to completion so that the order of pixel packet operations is preserved. Additional control resources (e.g., for maintaining proper order pixel processing flow and tracking) are not required since the pixel packet in a sense continues to flow through the pipeline in a proper order in implementations that permit the sideband to be clocked. In an alternate embodiment, additional power conservation is provided by removing both the sideband portion and payload portion of a pixel packet from the pipeline and notifying a gatekeeper stage when pixel packet information is removed from the pipeline.

Figure 4A:
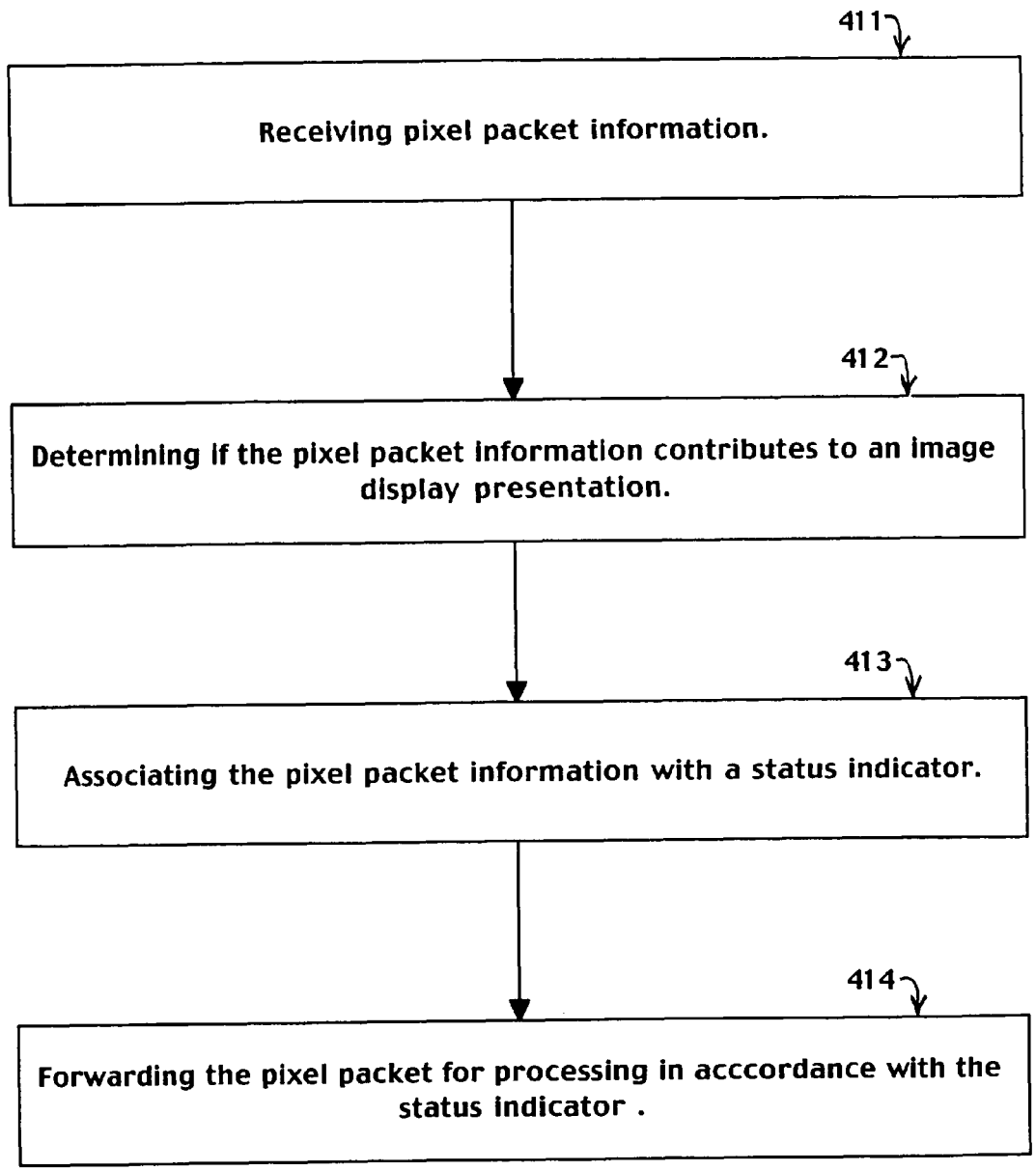
FIG. 4A is a flow chart of pixel processing method in accordance with one embodiment of the present invention.
Figure 4:
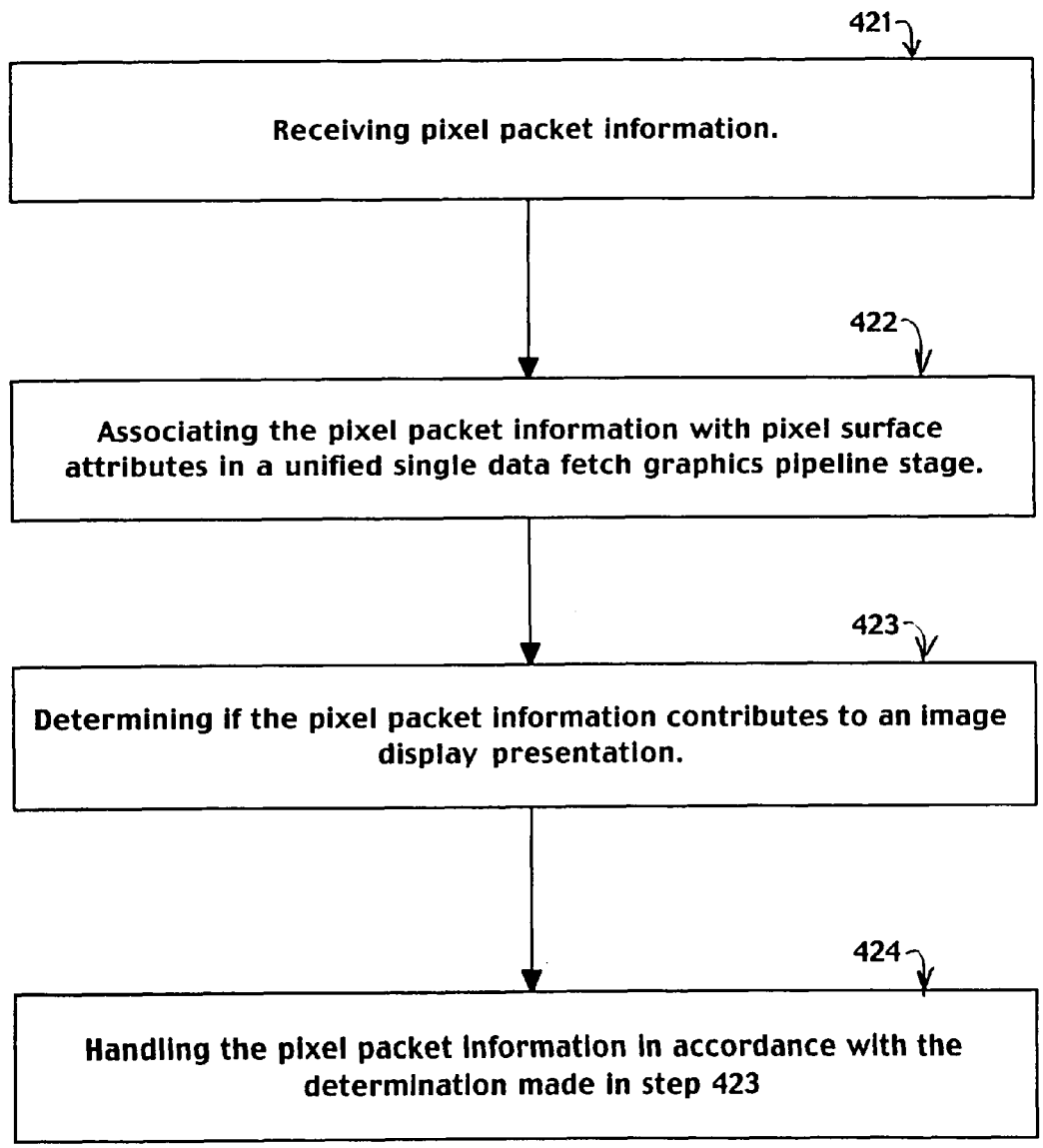
FIG. 4B is a flow chart of another pixel processing method in accordance with one embodiment of the present invention.
FIG. 4C is a flow chart of an exemplary method for tracking pixel information in a graphics pipeline in accordance with one embodiment of the present invention.
FIG. 4D is a block diagram of exemplary pipestage circuitry in accordance with one embodiment of the present invention.
FIG. 4E is a block diagram of an exemplary graphics pipeline in accordance with one embodiment of the present invention.
FIG. 4F is a block diagram of an exemplary implementation of graphics pipeline modules with multiple pixel packet rows in accordance with one embodiment of the present invention.

FIG. 4A is a flow chart of pixel payload processing method 410 in accordance with one embodiment of the present invention. In one embodiment, pixel payload processing method 410 is performed in a data fetch stage of a graphics processing pipeline.

In step 411 pixel packet information is received. In one embodiment of the present invention the pixel packet information is included in pixel packet row received from a graphics pipeline raster stage (e.g., raster stage 110) or from the gatekeeper stage. In one exemplary implementation, receiving pixel packet information also includes retrieving pixel surface attribute values in a single unified data fetch stage. The pixel surface attribute values can be inserted in the pixel packet row.

At step 412 a determination is made if the pixel packet information contributes to an image display presentation. In one embodiment the determination includes analyzing if a pixel associated with the pixel packet information is occluded. For example, a depth comparison of Z values is performed to determine if another pixel already processed and written to a frame buffer is in "front" of a pixel currently entering a data fetch stage. In this case the current pixel is demarked as killed.

The pixel packet information is associated with a status indicator in step 413. The status indicator indicates if the pixel packet information (e.g., row) contributes to the image display presentation. In one embodiment, the status indicator is a bit included in sideband data of the pixel packet. In one exemplary implementation the status indicator is a kill bit included in sideband data of the pixel packet and is set to prevent logic components from clocking the pixel packet payload if the status indicator indicates if the pixel packet payload does not impact the image display presentation while continuing to clock pixel packet sideband information. Alternatively, the status indicator is a kill bit included in sideband data of the pixel packet and is set to enable logic components if the status indicator indicates if the pixel packet payload does impact the image display presentation.

In step 414 the pixel packet information is forwarded for downstream processing in accordance with the pixel packet payload status indicator. In one embodiment, the pixel packet status indicator is utilized as an enable indication for logic components of downstream pipestages. Alternatively, the pixel information may be immediately discarded by the data fetch pipestage.

In one embodiment of pixel payload processing method 410, pixel packet information is included in a plurality of pixel packet rows and a status indicator coordination process is performed to coordinate a plurality of status indicators respectively associated with each one of the plurality of pixel packet rows. In one exemplary implementation, each of the plurality of status indicators is set to indicate corresponding pixel packet rows do not contribute to said image display presentation if any one of the plurality of status indicators associated with a pixel indicates the pixel does not contribute to image display presentation.

Figure 4C:
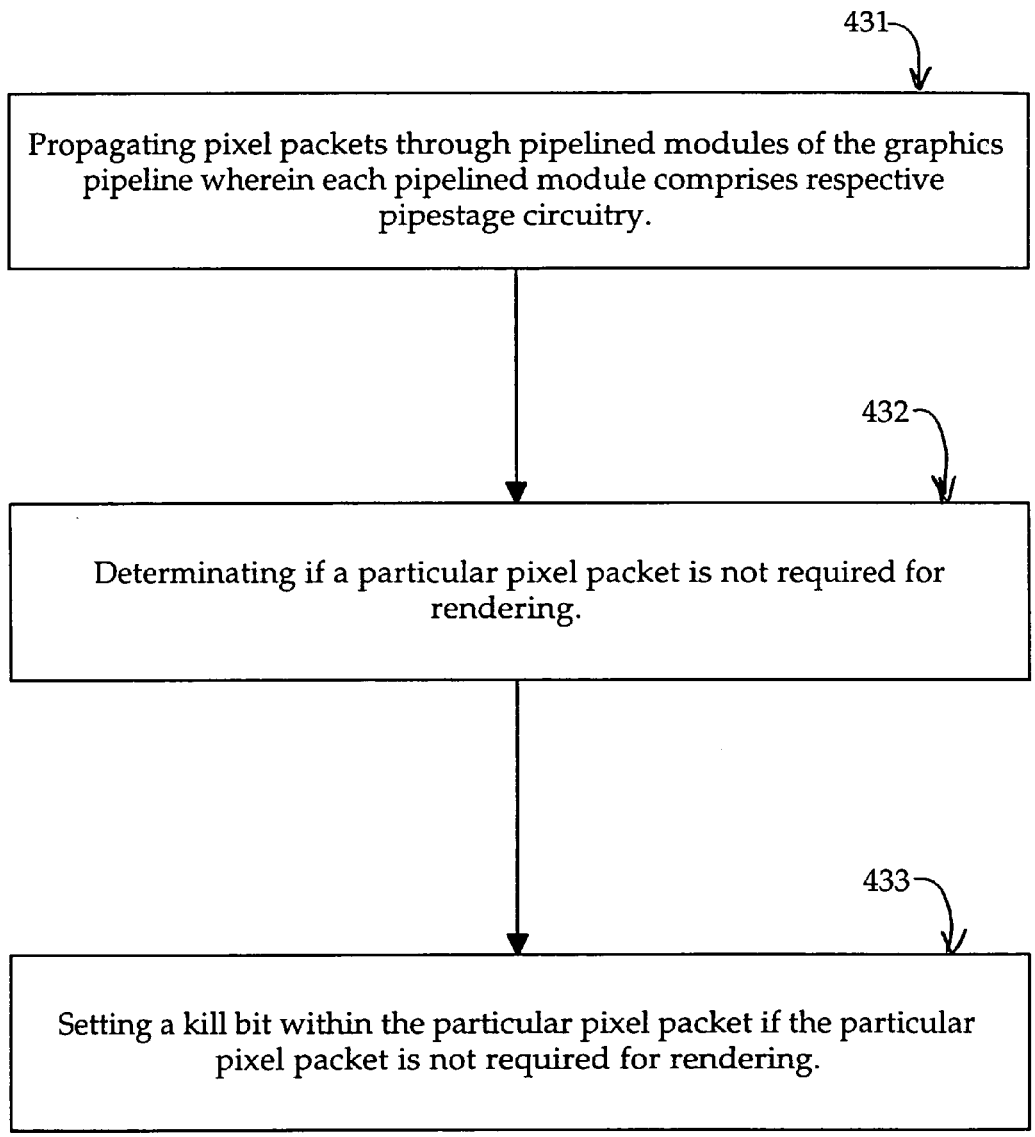
Figure 4D:
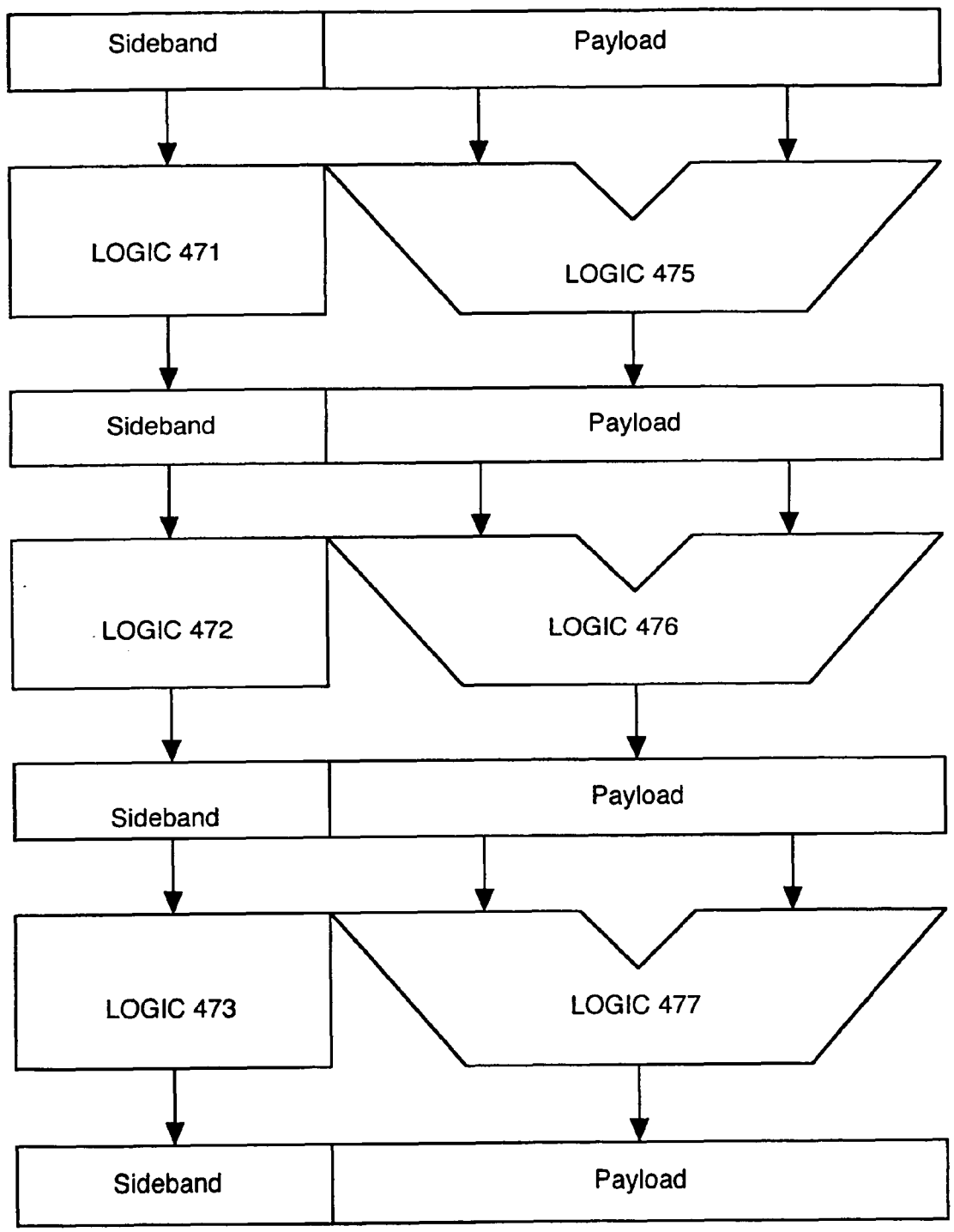

FIG. 4D is a block diagram of exemplary downstream pipestage circuitry in accordance with one embodiment of the present invention. The pipestages continue to propagate the sideband portion through the subsequent pipestage circuitry of the graphics pipeline notwithstanding the kill bit being set for killed pixels. For example, the sideband portion is sequentially clocked through logic components 471 through 473 and the payload portion is not clocked through logic components 475 though 477. In one embodiment, a downstream data write module reports to an upstream scoreboard module that the particular pixel packet has propagated through the graphics pipeline. In this way, written and killed pixels are marked as retired.

FIG. 4B is a flow chart of pixel processing method 420 in accordance with one embodiment of the present invention.

In step 421 pixel packet information is received. In one embodiment of the present invention the pixel packet information is included in pixel packet row produced by a graphics pipeline raster stage (e.g., raster stage 110) and received from a gatekeeper module for instance.

At step 422 pixel surface attribute values associated with the pixel packet information in a unified single data fetch graphics pipeline stage. The pixel surface attribute values can be inserted in the pixel packet row.

At step 423 a determination is made if the pixel packet information contributes to an image display presentation. In one embodiment the determination includes analyzing if a pixel associated with the pixel packet information is occluded.

In step 424, the pixel packet information processing is handled in accordance with results of the determination made in step 413. In one embodiment, the pixel surface attribute values are incorporated in the pixel packet information for further processing if the pixel contributes to the image display presentation. Otherwise, the pixel (e.g. the pixel surface attribute values and pixel packet information) are removed from further processing if the pixel surface attribute values do not contribute to the image display presentation. The pixel packet can include a plurality of rows and the handling is coordinated for the plurality of rows. For example, multiple rows associated with a pixel are removed or deleted from the pipeline if a determination is made in processing one row associated with the pixel that the pixel does not contribute to an image presentation. In one exemplary implementation, other stages of a graphics pipeline are notified if one of the plurality of rows includes a pixel surface attribute value that indicates the pixel packet does not impact the image display presentation. In other words kill bits can be quickly propagated through the rows of a pixel packet associated with a killed pixel.

Figure 4E:
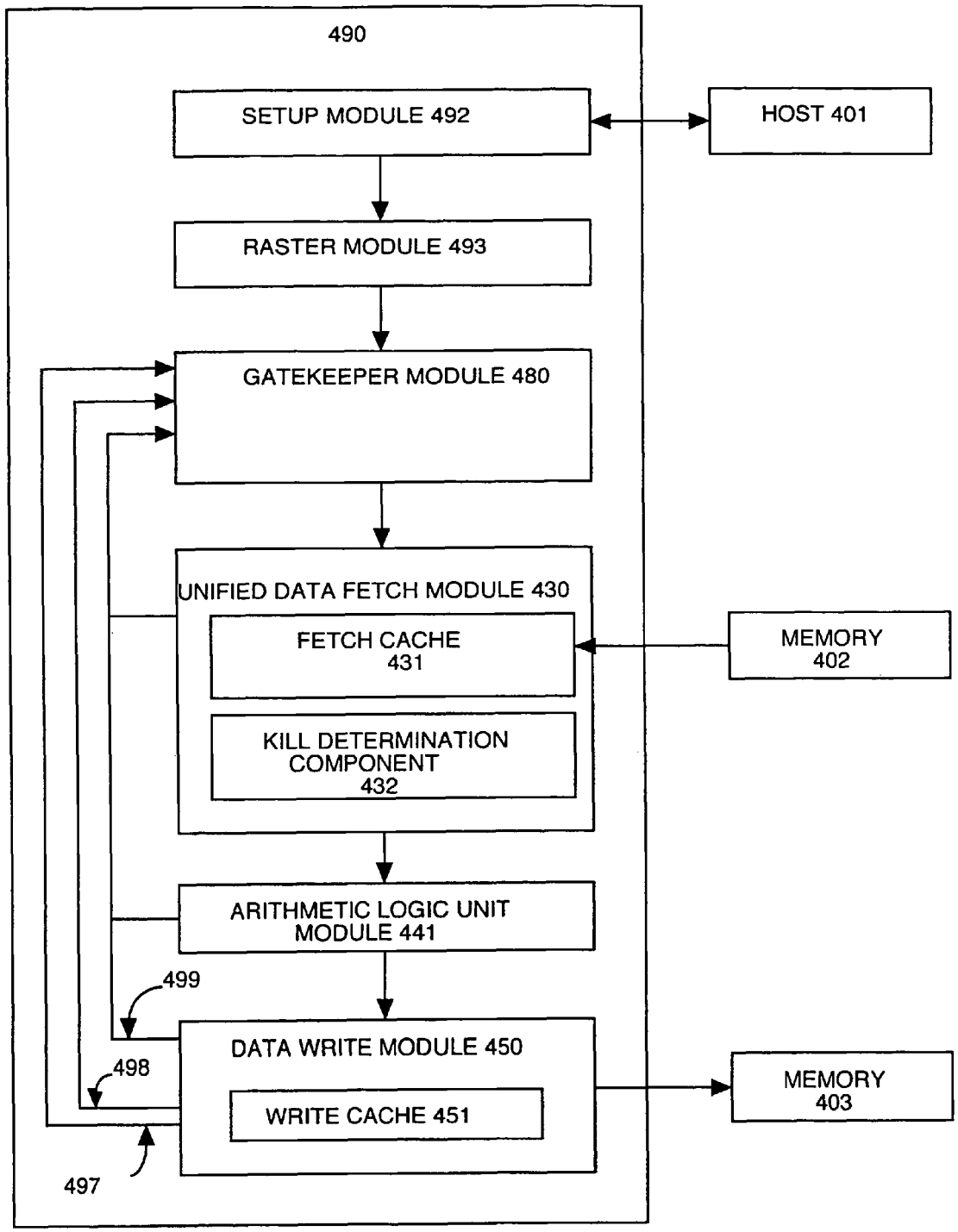

FIG. 4E is a block diagram of graphics pipeline 490 in accordance with one embodiment of the present invention that permit multiple stages of a pipeline to provide notification to a gatekeeper stage. Graphics pipeline 490 includes setup module 491, raster module 492, gatekeeper module 480, unified data fetch module 430, arithmetic logic unit (ALU) module 493, and data write module 450 which perform similar operations as corresponding components in graphics pipeline 390. In one embodiment, graphics pipeline 490 is implemented as a graphics pipeline processing core (e.g., in a graphics processing chip, in an application specific integrated circuit, a central processing unit, integrated in a host processing unit, etc.). Modules of graphics pipeline 490 can also be utilized to implement corresponding stages of graphics pipeline 100.

In one embodiment of the present invention, pixel "kill" determinations can be made in multiple stages of a graphics pipeline. In one exemplary implementation, a unified data fetch module, arithmetic logic unit (ALU) module, and data write module can make a "kill" determination. The multiple stages of a graphics pipeline can also provide notification to a gatekeeper module of the graphics pipeline.

In addition to performing similar operations as graphics pipeline 390, components of graphics pipeline 490 also handle early kill pixel situations. Unified data fetch module 430 includes kill determination component 432 for determining if pixel information does not contribute to an image display presentation. In one embodiment, kill determination component 432 analyzes if a pixel is occluded. For example, kill determination component 432 performs a depth comparison (e.g., compares Z values) between two pixels designated for presentation in the same screen display area (e.g., a single and or a plurality of monitor screen pixels). The two pixels include a pixel entering unified data fetch module 430 and a pixel that previously entered unified data fetch module 430.

In addition to pixel information recirculation path 497 and pixel clear path 498, in one embodiment graphics pipeline 490 also includes pixel removal notification path 499 available from multiple pipestages. Pixel information recirculation path 497 permits data write module 450 to re-circulate pixel packet information (e.g., pixel packet rows) to gatekeeper module 480. Pixel clear path 498 permits data write module 450 to notify gatekeeper module 480 when a pixel is written to memory 430. Pixel removal notification path 499 permits unified data fetch module 430, arithmetic logic unit module 441 and data write module 451 to notify gatekeeper module 480 when each of these components respectively remove a pixel packet row from the pipeline thereby increasing skid within the pipeline. Pixel packets that are removed are immediately discarded (e.g., payload as well as sideband portions). In exemplary implementations in which a status indicator kill bit is included in a pixel packet sideband, graphics pipeline 490 does not include pixel removal notification path 499 since the pixel is not removed from the pipeline. The pixel is treated as being completed normally for purposes of notifying gatekeeper 480 (e.g., via pixel clear path 498) even though the pixel payload is not processed and the pixel is not written to memory 403. In response to the pixel removal notifications from path 499 the gatekeeper can allow more pixels into the downstream pipestage.

Figure 4F:
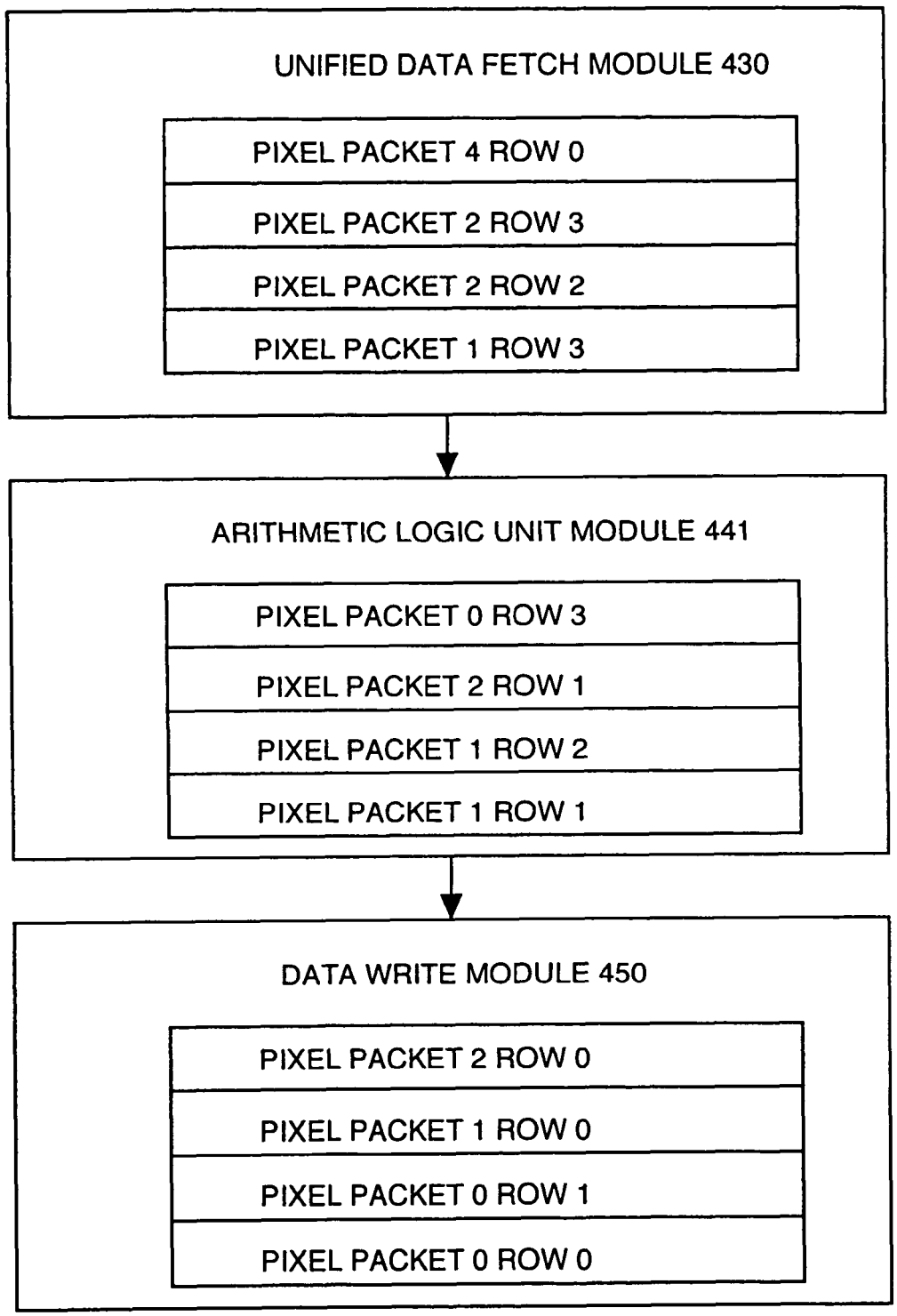

FIG. 4F is a block diagram of an exemplary implementation of graphics pipeline 490 modules with multiple pixel packet rows in accordance with one embodiment of the present invention. Unified data fetch module 430, arithmetic logic unit module 441 and data write module 450 handle pixels that do not contribute to the image display presentation differently depending upon whether there is a status indicator (e.g. kill bit included in the side band portion). If a kill bit is included in the sideband portion of a pixel packet row unified data fetch module 430, arithmetic logic unit module 441 and data write module 450 smear the status indicator setting to other rows associated with the pixel packet thereby spreading power savings to all the rows. For example, if pixel packet 1 row 1 does not includes a set kill bit when received in arithmetic logic unit module 441 and pixel packet 1 row 2 does include a set kill bit, arithmetic logic unit module 441 changes the kill bit to set it in pixel packet 1 row 1 and stops processing the payload portion. In implementations in which a "killed" pixel is removed from the graphics pipeline, unified data fetch module 430, arithmetic logic unit module 441 and data write module 450 remove all pixel packet rows associated with the pixel and notify gatekeeper module of the row removal. For example, arithmetic logic unit module 441 removes pixel packet row 1 and row 2 if pixel 1 is killed.

Referring back now to FIG. 4B, in one embodiment pixel processing method 420 also includes controlling input flow of a plurality of pixel packets into the unified single data fetch graphics pipeline stage. For example, the control includes maintaining sufficient slackness in the input flow to prevent stalling in a pipeline operating on the plurality of pixel packets. The control can also include permitting information associated with another one of the plurality of pixel packets to flow into the unified single data fetch graphics pipeline stage if the pixel packet information associated with the first pixel packet is removed from further processing. A gatekeeper stage is notified if the pixel packet information is removed from further processing. The amount of slack within the pipeline (e.g., the amount of data "holes" flowing through) is also referred to as "skid".

FIG. 4C is a flow chart of method 440 for tracking pixel information in a graphics pipeline in accordance with one embodiment of the present invention.

In step 441, pixel packets are propagated through pipelined modules of the graphics pipeline wherein each pipelined module comprises respective pipestage circuitry.

In step 442, a determination is made if a particular pixel packet is not required for rendering. In one embodiment, the graphics pipeline includes an upstream data fetch module (e.g., unified data fetch module 430) that determines if the particular pixel packet is not required for rendering. In one exemplary implementation the determination is made as a result of a depth test performed on the particular pixel packet.

In response to the determination results of step 442, a kill bit within the particular pixel packet is set in step 443 if the particular pixel packet is not required for rendering. In one embodiment, the setting is performed by a pipestage module setting kill bits associated with a plurality of rows of the pixel packet in response to the determination results.

In response to the kill bit being set, a data portion of the particular pixel packet is prevented from being clocked through subsequent pipestage circuitry of the graphics pipeline in step 443. In one embodiment, a kill bit is utilized as an enable signal for the clocking apparatus of subsequent pipestage circuitry of the graphics pipeline.

Arbitary Size Texture Palletes

The present invention also facilitates efficient texture application operations. In one embodiment, objects are be rendered more efficiently by adding a texture to each of a small number of relatively large polygons rather than rendering a large number of relatively small polygons without texture. For example, rendering a realistic looking tree may require rendering a tree-trunk with lighter and darker bands, as well as complex pattern of leaves. The tree-trunk can be efficiently and realistically rendered with a few relatively large polygons, with a texture applied to each polygon that gives the appearance of tree-bark. In one exemplary implementation, all of the leaves can be rendered by applying a leaf texture to one or a few relatively large polygons. In addition, applying textures to a relatively few larger polygons is more efficient than attempting to create detail by rendering many smaller polygons without an applied texture.

In one embodiment the present invention includes a texture palette including a number of entries that each defines a property, such as a color, that can be applied to a texture to create a "paletted texture." The present invention can permit a software program to employ multiple texture palette tables having different resolutions from one another, while using system resources efficiently. One reason a texture palette is used in this fashion is to provide data compression of the texture map.

In one embodiment, the present invention can permit paletted textures to be rendered utilizing a relatively small amount of resources (e.g., computer memory to store texture palettes, chip space, power consumption, etc.). Embodiments of the present invention can also permit flexible implementation of texture pallets and texture maps. In one exemplary implementation, the same texture palette can be flexibly adjusted to arbitrary size texture palette tables suitable for a variety of different texture maps.

Embodiments of the present invention provide for FIG. 5A illustrates an embodiment of the present invention of a texture palette data structure 500 comprising texture palette tables 502 of arbitrary size. A texture palette table 502 comprises a size defined by a number of entries of texel data. As used throughout this description, the term "arbitrary size" means that at least two sizes of texture palette table 502 are allowed other than the full size of the palette data structure 500. It is not required that every possible size texture palette table 502 be allowed. For example, in some embodiments, the texture palette tables 502 each comprise a size that is a multiple of 16 entries. In another embodiment, a texture palette table 502 is allowed to have a size that is any size that fits into the data structure 500 without overlapping another texture palette table.

The portion of a computer readable medium that is allocated for the texture palette storage 500 may be re-writeable. Thus, the configuration of the texture palette data structure 500 is arbitrarily re-configurable such that the partitioning of the texture palette data structure 500 may be altered. For example, when one or more texture palette tables 502 are no longer in use they may be replaced by any size texture palette table 502 that fits in the newly un-occupied portion of the texture palette storage 500. However, for convenience and performance, it may be desirable to work with a given set of texture palette tables 502 for a period of time.

The texture palette storage 500 in FIG. 5A comprises n entries, wherein "n" is a count of unique indices (typically a power of two) to address entries in the texture palette storage 500. These entries may be of any suitable width, for example, 16-bits, 32-bits, etc. Furthermore, because the texture palette storage 500 is relatively small, embodiments in accordance with the present invention help to conserve power. The texture palette storage 500 comprises 256 entries, in accordance with an embodiment of the present invention. However, any convenient size may be used. Each entry may contain texel data. The texture palette storage 500 may be of any convenient width, for example, 16 bits, 32 bits, etc. In accordance with one implementation, each entry contains red, green, blue, and alpha information for one texel. However, the present invention is not limited to any particular data format for the texel data.

A given texture palette table 502 may comprise any number of entries, up to the size of the texture palette storage 500, in accordance with embodiments of the present invention. Each entry may describe data for a single texel. As is understood by those of ordinary skill in the art, textures may be "palletized" by applying data from one of the texture palette tables 502 based on a texture map's "texels". The actual application of the texture data may be performed in an ALU. A texture map may comprise an index for each texel that describes what entry in a given texture palette table 502 should be used for processing each texel. The texel color value may be the index. A given texture palette table 502 may be used by many different texture maps. However, in some cases a different texture palette table 502 is desired for a different texture map. For example, different texture maps may use different texture resolution, and hence may be able to use a different size texture palette table 502.

Known conventional texture rendering techniques are limited in that they require texture palette storage to be either used entirely for one texture palette table or for the table to be divided into texture palette tables of equal size. For example, a texture palette storage that has 256 entries may in one conventional mode be used for merely one texture palette table. In another conventional mode, the texture palette storage can be divided into exactly 16-texture palette tables, each of the exact same size. However, there is no known conventional provision for arbitrary size texture palette tables.

Because known conventional texture palette tables must be either 16 or 256 entries, the amount of texture resolution is effectively limited to either a relatively high 8-bit resolution or a relatively low 4-bit resolution with no choice between the two resolutions. However, in accordance with embodiments of the present invention the texture palette tables may be defined to be any of arbitrary size. Therefore, the texture resolution is not limited to 8-bits or 4-bits, in accordance with embodiments of the present invention.

Embodiments of the present invention allow software to employ texture palette tables of arbitrary size. Therefore, software may employ texture palettes having different resolution from one another, while making efficient use of system resources. For example, a software program may be using the texture palette storage 500 for a first texture palette table 502 having a relatively high resolution. For example, if the texture palette storage 500 comprises 256 entries, then the texture palette table 502 provides 8-bits of texture resolution, which for the sake of illustration is referred to as a relatively high resolution.

Embodiments of the present invention allow the texture palette storage 500 to be used for a second texture palette table without the first texture palette table losing significant resolution. For example, the first and the second texture palette table may share the texture palette storage 500 in whatever proportion that the application program desires. For example, the second texture palette table may have 4-bits of resolution and, as such, only require 16 entries in the texture palette storage 500. The application program or another software program may slightly compress the resolution of the first texture palette table, such that a new texture palette table having 240 entries will suffice. Thus, the texture palette storage 500 is partitioned into the new first texture palette table of 240 entries and the second texture palette table of 16 entries. Consequently, together the two tables make full use of the texture palette storage 500. Moreover, the resolution of the first texture palette table is reduced only slightly. Furthermore, system resources are efficiently utilized.

FIG. 5B illustrates combining logic 506 used to form an index to access texel data for the texture palette storage (FIG. 5A, 500), in accordance with one embodiment. A table offset and a texel index are input into the combining logic 506. The table offset defines the starting location of the texture palette table (FIG. 5A, 502) for which texel data is desired. The texel index defines the offset into the particular texture palette table. Thus, together the table offset and the texel index specify the address of a texel data entry in the texture palette storage. The texture index may be accessed from, for example, a data fetch unit (FIG. 3). The table offset may be stored in a table offset register 508.

In accordance with one the embodiment of the present invention, the combining logic 506 is an n-bit adder and the texture palette storage comprises 2' entries. However, it is not required for the combining logic 506 to be implemented as an adder. If either the table offset or the texel index is not an n-bit value, they may be adjusted prior to being input to the combining logic 506 such that they are formatted as n-bit values. For example, the table offset and/or the texel index may have zeroes added or have bits masked, in accordance with various embodiments. In accordance with one embodiment, "n" is equal to 8 and the combining logic 506 is an 8-bit adder. It will be understood that it is not required that the texel index and the table offset comprise the same number of significant bits.

Figure 5C:
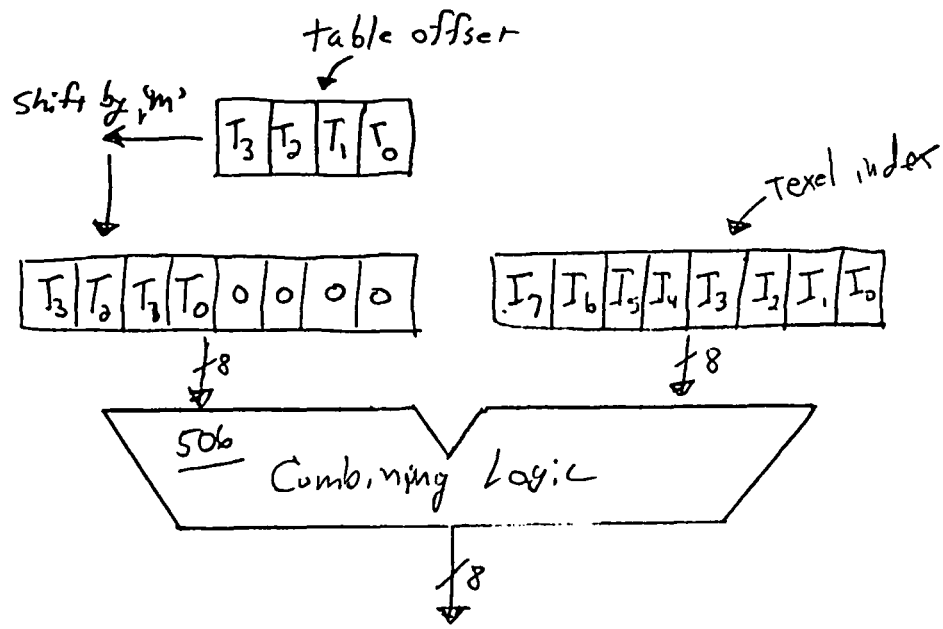
FIGS. 5C-5F are diagrams illustrating exemplary techniques of accessing texture palette storage having arbitrary size texture palette tables, in accordance with embodiments of the present invention.

In some embodiments, the table offset comprises 4-bits of significant information that is padded with zeroes before it is sent to the combining-logic 506. Referring now to FIG. 5C, a 4-bit table offset comprising bits $T_0$-$T_3$ is padded with zeroes to form an 8-bit value with the four least significant bits "0000". This may be implemented by shifting the table offset left by m bits prior to inputting the table offset into the combining logic 506. Thus, in this embodiment, the table offset can uniquely specify 16 addresses. In one embodiment, the texel index comprises bits $I_0$-$I_7$. All bits of the texel index may comprise valid information. If desired, portions of the texel index may be masked (not depicted in FIG. 5C). In embodiments in which the table offset is limited to a 4-bit value, the texture palette tables may be limited to start at addresses that are multiples of 16. However, the texture palette tables may be of different sizes from one another. This provides the advantage of being able to concurrently use the texture palette storage for relatively small texture palette table and a larger texture palette table. For example, if one texture palette table comprises 16 entries, another next texture palette table may comprise 64 or more entries.

Figure 5D:
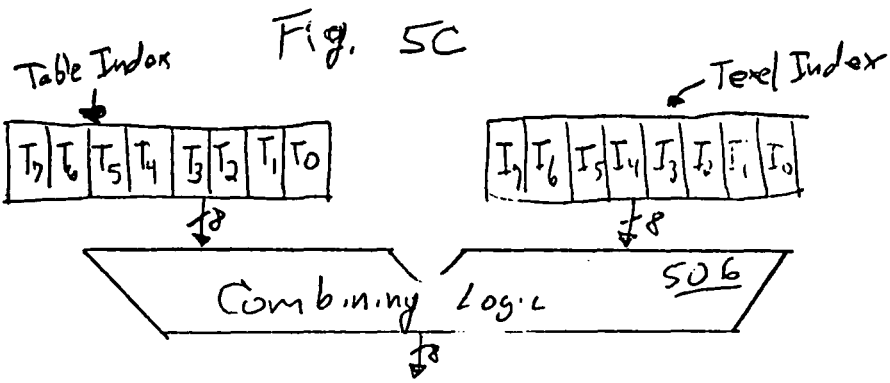

In other embodiments, the table offset comprises 8-bits of significant information. Referring now to FIG. 5D, an 8-bit table offset comprises significant bits $T_0$-$T_7$. Thus, in these embodiments, the table offset can uniquely specify any address in a 256-entry texture palette storage 500. Therefore, this embodiment of present invention allows the texture palette tables to start at any arbitrary location in the texture palette storage. In this embodiment, the texel index comprises 8 bits of significant information. However, if desired portions of the texel index may be masked (not depicted in FIG. 5D).

Figure 5E:
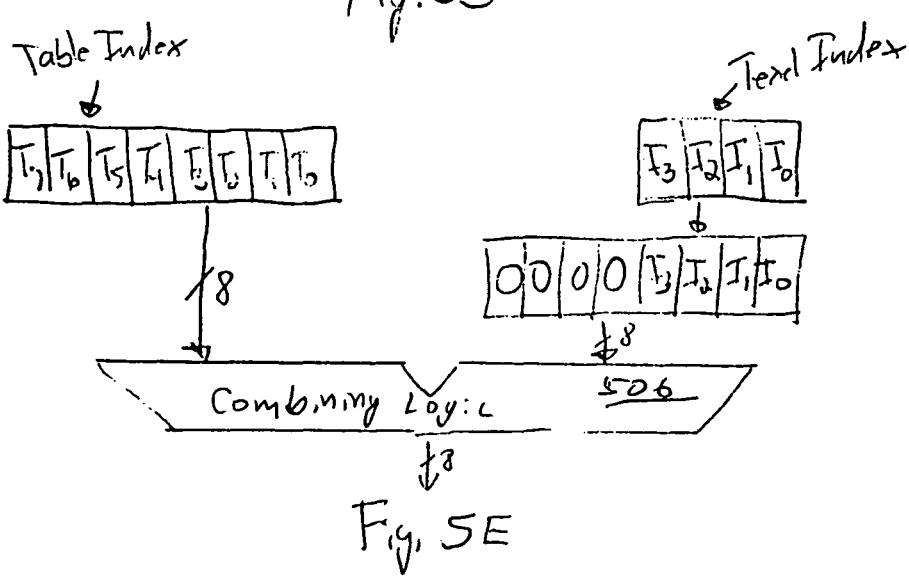

In still other embodiments, the table offset comprises 8-bits of significant information and the texel index comprises 4-bits of significant information. Referring now to FIG. 5E, an 8-bit table offset comprises significant bits $T_0$-$T_7$. The texel index comprises significant bits $T_0$-$T_3$, which are padded with 4 bits to form an 8-bit value.

It will be understood that the examples illustrated in FIGS. 5C-5F are for illustrative purposes and that the present invention is not limited to any particular number of bits for the table offset, the texel index, and the end result of combining the table offset and texel index.

Figure 5F:
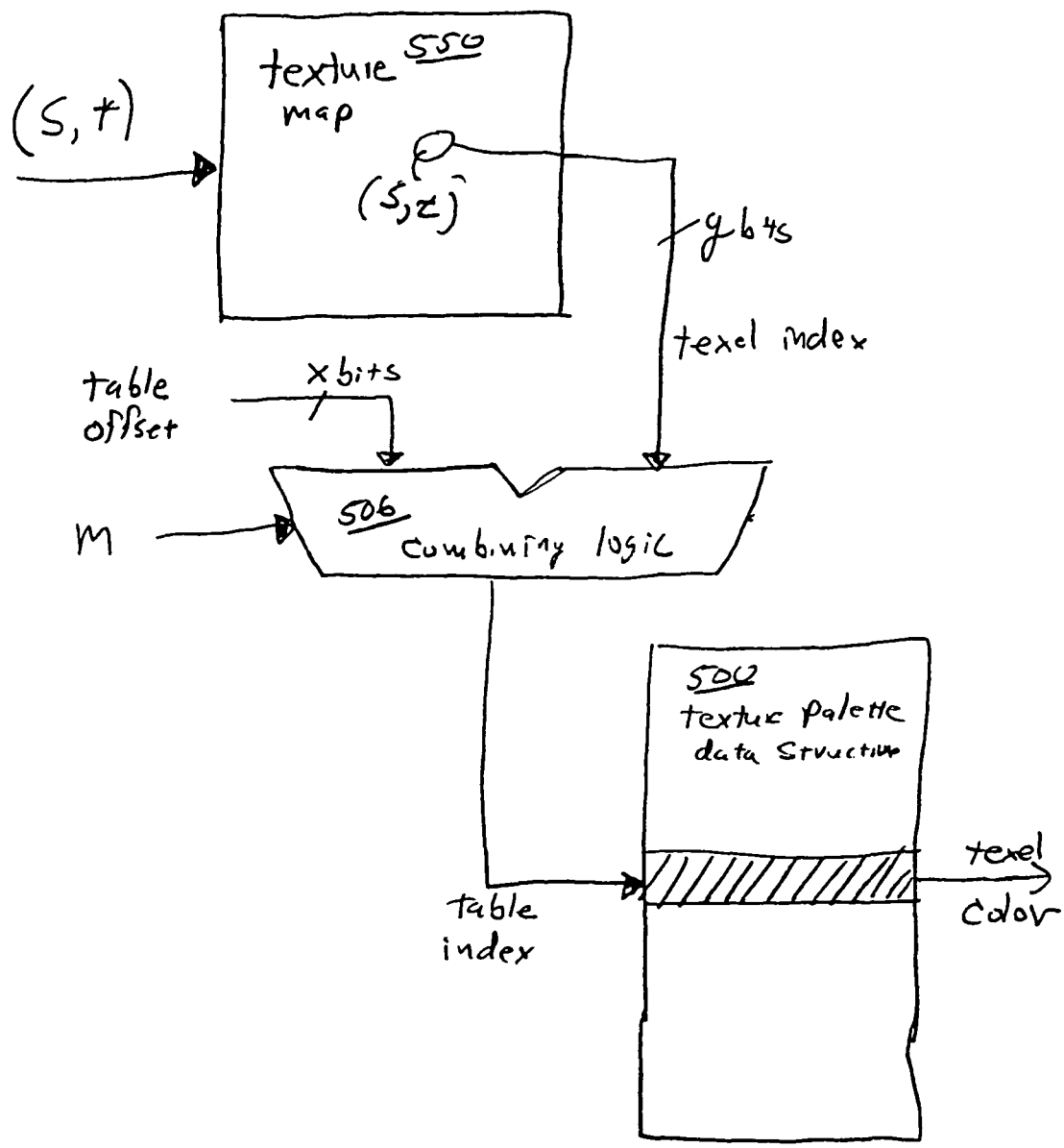

FIG. 5F is a diagram illustrating an exemplary technique of accessing texture palette storage having arbitrary size texture palette tables, in accordance with an embodiment of the present invention. Based on variables (s, t) a texel index of y bits is accessed from a texture map 550. The texel index is one of the inputs to combining logic 506. A table offset of x bits is accessed and input into the combining logic 506. The table offset is shifted in accordance with the value of m. For example, when m is 16, the table offset is bit shifted four positions to effectively multiply the table offset by 16. When m is eight, the table offset is bit shifted three positions to effectively multiply the table offset by eight. The multiplier m may be any convenient value. When m is one, the table offset is not bit shifted. Alternatively a lookup table of offset values may be used. It will be understood, however, that the table offset may be formed in any convenient fashion. In accordance with one embodiment, the table offset is determined by consulting a look-up table of offset values (not depicted in FIG. 5F). Furthermore, it will be understood that the table offset is allowed to be any value up to the size of the texture storage data structure. The output of the combining logic 506 is a tale index for the texture palette data structure 500. A texel color is output, based on indexing the texture palette data structure 500.

Figure 6A:
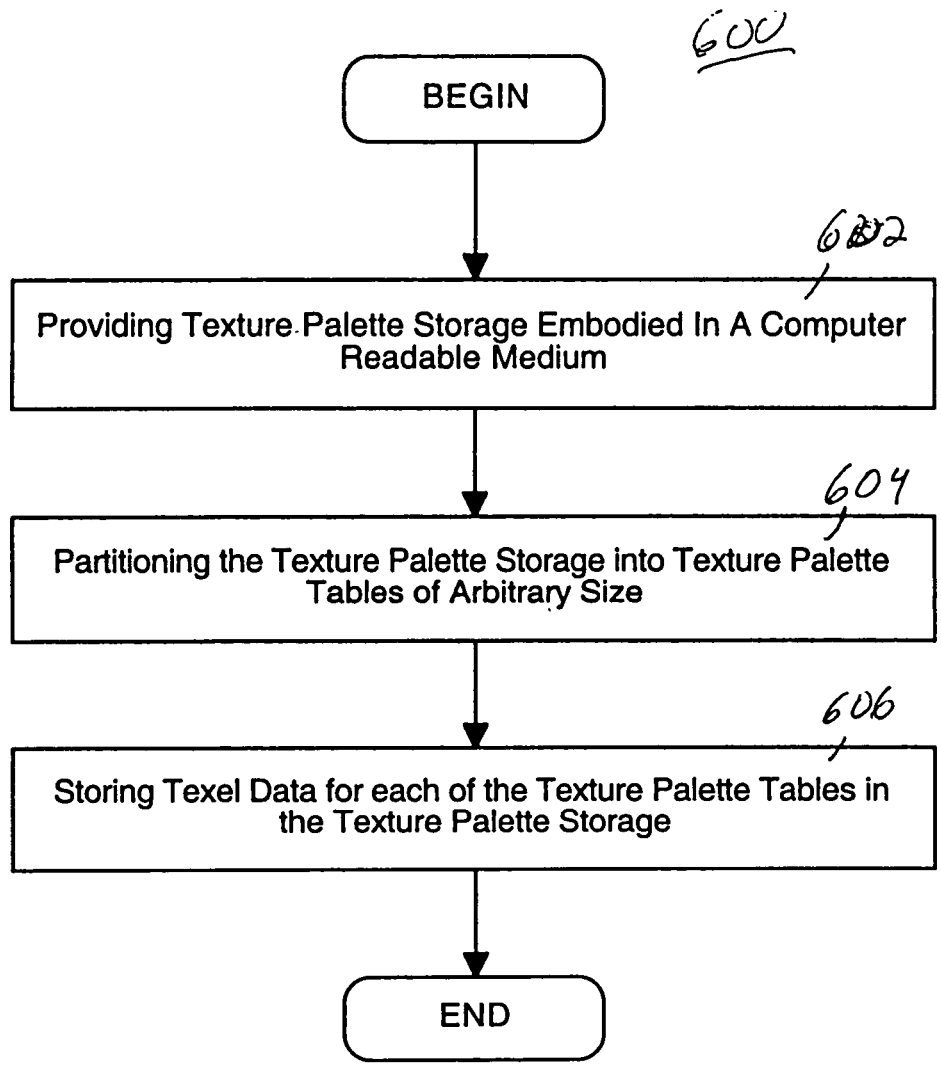
FIG. 6A is a flowchart illustrating a process of providing arbitrary size texture palette tables, in accordance with an embodiment of the present invention.

FIG. 6A illustrates a flowchart illustrating steps of an electronic process 600 of providing arbitrary size texture palette tables, in accordance with an embodiment of the present invention. Steps of process 600 may be stored as instructions on a computer readable medium and executed on a general-purpose processor or special purpose electronics. In 602, texture palette storage in embodied in a computer readable medium is provided.

In 604, the texture palette storage is partitioned into a plurality of texture palette tables of arbitrary size. Block 604 may comprise allocating a first portion of the texture palette storage to a first texture palette table that is allowed to have a size that is any multiple of 16 that fits into the data structure without overlapping another texture palette table. In another embodiment, block 604 comprises allocating portions of the texture palette storage to texture palette tables that are allowed to be of any size up to and including the size of the texture palette storage that fit into the data structure without overlapping another texture palette table. The table offset value marks the starting address of a particular palette table. Each defined table therefore has its own table offset value.

In block 606, texel data is stored for each of the texture palette tables in the texture palette storage. Block 604 may be repeated such that comprising the texture palette storage is re-partitioned into texture palette tables of arbitrary size. This allows the configuration of the texture palette storage to be dynamically configured at the discretion of software. Embodiments of the present invention allow software to dynamically configure the texture palette storage into texture palette tables of any size that will fit into the allocated texture palette storage. In one embodiment, a software program is allowed to select a mode of using the texture palette storage such that the texture palette storage is partitionable into texture palette tables of arbitrary size.

Figure 6B:
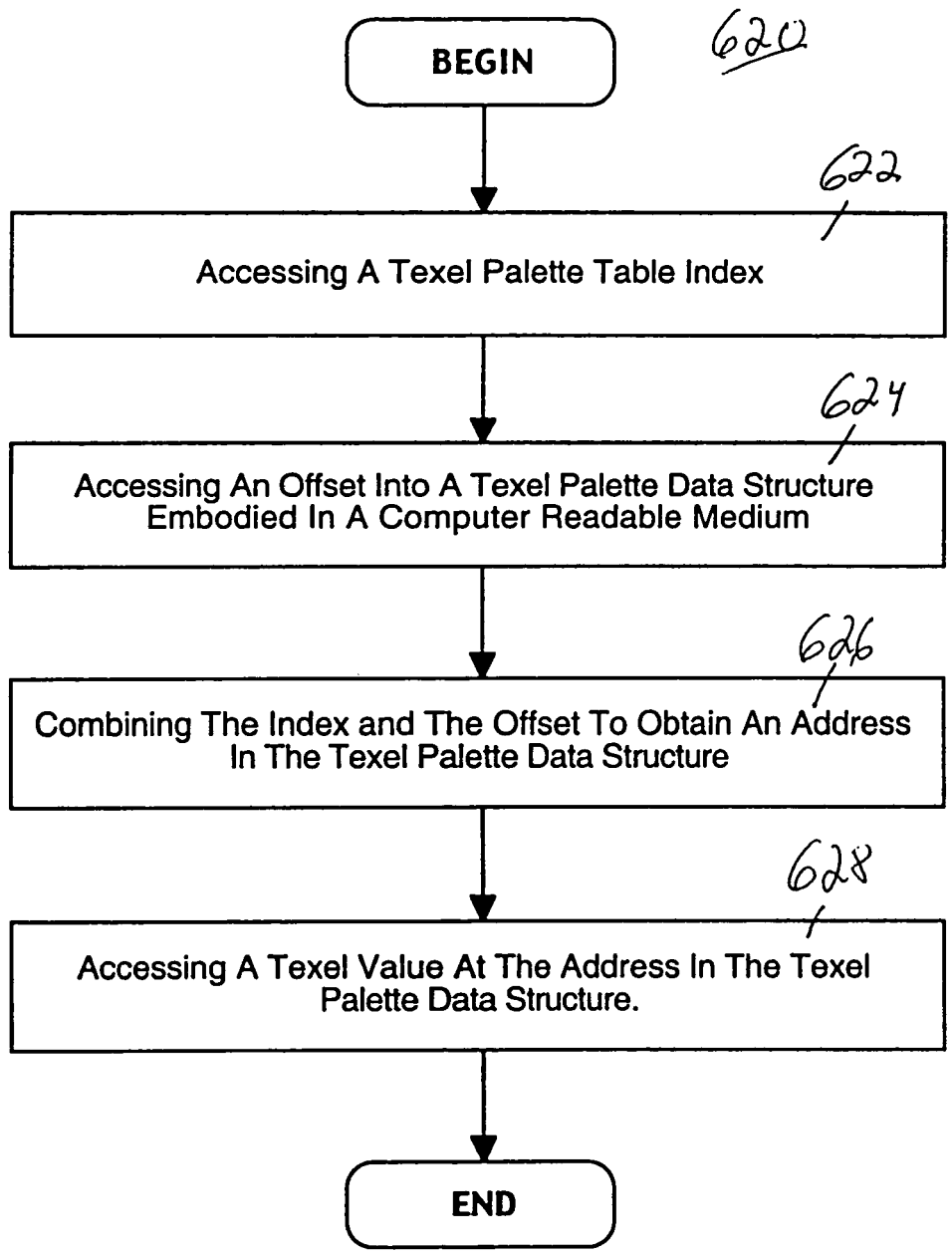
FIG. 6B is a flowchart illustrating steps of a process of accessing data stored in arbitrary size texture palette tables, in accordance with an embodiment of the present invention.

FIG. 6B illustrates a flowchart illustrating steps of a process 620 of accessing data stored in arbitrary size texture palette tables, in accordance with an embodiment of the present invention. Acts of process 620 may be stored as instructions on a computer readable medium and executed on a general-purpose processor. In block 622, a texel index is accessed. For example, the texel index may be accessed from a data fetch unit. The texel index includes 8-bits of significant information, in accordance with an embodiment of the present invention. The texel index includes 4-bits of significant information, in accordance with another embodiment of the present invention. In one embodiment, the texel index is the output value from a texture map for a particular texel coordinate (s,t).

In block 624, an offset into a texture palette storage embodied in a computer readable medium is accessed. The offset includes 8-bits of significant information, in accordance with an embodiment of the present invention. The offset includes 4-bits of significant information, in accordance with an embodiment of the present invention. The table offset defines a particular palette table.

In block 626, the texel index and the table offset are combined to obtain a texture palette storage index. The texel index and the table offset may be added in an 8-bit adder to obtain a texture storage data structure index, which defines an address in the texture storage data structure index. Thus, embodiments of the present invention do not require sophisticated hardware to generate a pointer into the texture palette storage. To prepare the texel index for combining at least one bit of the index may be masked prior to the combining the texel index to the offset to obtain the texture palette storage index. As discussed, a bit shift operation may be performed on the table offset prior to the combining. When m is 16, bits are shifted four positions. When m is 8, bits are shifted three positions. When m is four, bits are shifted two positions. When m is two, bits are shifted one position. When m is one, bits are not shifted. It will be understood, however, that the table offset may be formed in any convenient fashion. In accordance with one embodiment, the table offset is determined by consulting a look-up table. Furthermore, it will be understood that the table offset is allowed to reference any location in the texture storage data structure.

In block 628, a texel value in the texture palette storage is accessed, based on the texture palette storage index. The value obtained from the texture palette storage is a texel color for use by a pixel. The texel value may be passed on to an Arithmetic Logic Unit for further processing.

Coincident Pixel Tracking

Embodiments of the present invention coordinate the flow of pixels in a pipeline to maintain an appropriate processing flow (e.g., the order in which an application drew a triangle). For example, it is possible for an application to direct one triangle to be rendered over the top of another triangle. Under certain conditions, such as when the triangles are suitably sized (e.g., "overlapping") it is possible for a pixel associated with the second triangle to be coincident (e.g., have the same screen location) with a pixel from the first triangle. If operations are performed out of order, in particular while rendering transparent objects, the graphics pipeline can produce unexpected or incorrect results. Embodiments of the present invention include preventive measures to maintain an appropriate processing flow (e.g., order) for the pixels. In one embodiment, the present invention ensures a pixel associated with from the a triangle finishes processing before a coincident pixel from a second triangle progresses into the pipeline. For example, propagation of the second screen coincident pixel into a graphics pipeline is stalled until the first screen coincident pixel drains out of the graphics pipeline.

Embodiments of the present invention also coordinate the data coherency in accordance with pixel flow. In one embodiment, the present invention also facilitates memory (e.g., buffer, cache, etc.) coherency maintenance for data-fetch operations and data write operations. For example, the present invention can prevent read-modify-write hazards by coordinating entrance of coincident pixels in subsequent stages of a graphics pipeline with on going read-modify-write operations. In certain circumstances, it is possible for a data fetch cache to include stale data even though a screen coincident pixel has retired out of a write buffer. For example, for two screen coincident pixels, it is possible that a third intervening pixel could have loaded stale data from the data cache. This data would no longer be valid once the intervening pixel is written, but may be otherwise be accessed by the later screen coincident pixel without protections offered by the present invention. This can otherwise cause pollution of read data in a fetch cache. Embodiments of the present invention provide for invalidating a data cache based on pixel stalling. In one exemplary implementation, the present invention utilizes score boarding techniques to track and identify coincident pixel issues.

Figure 7A:
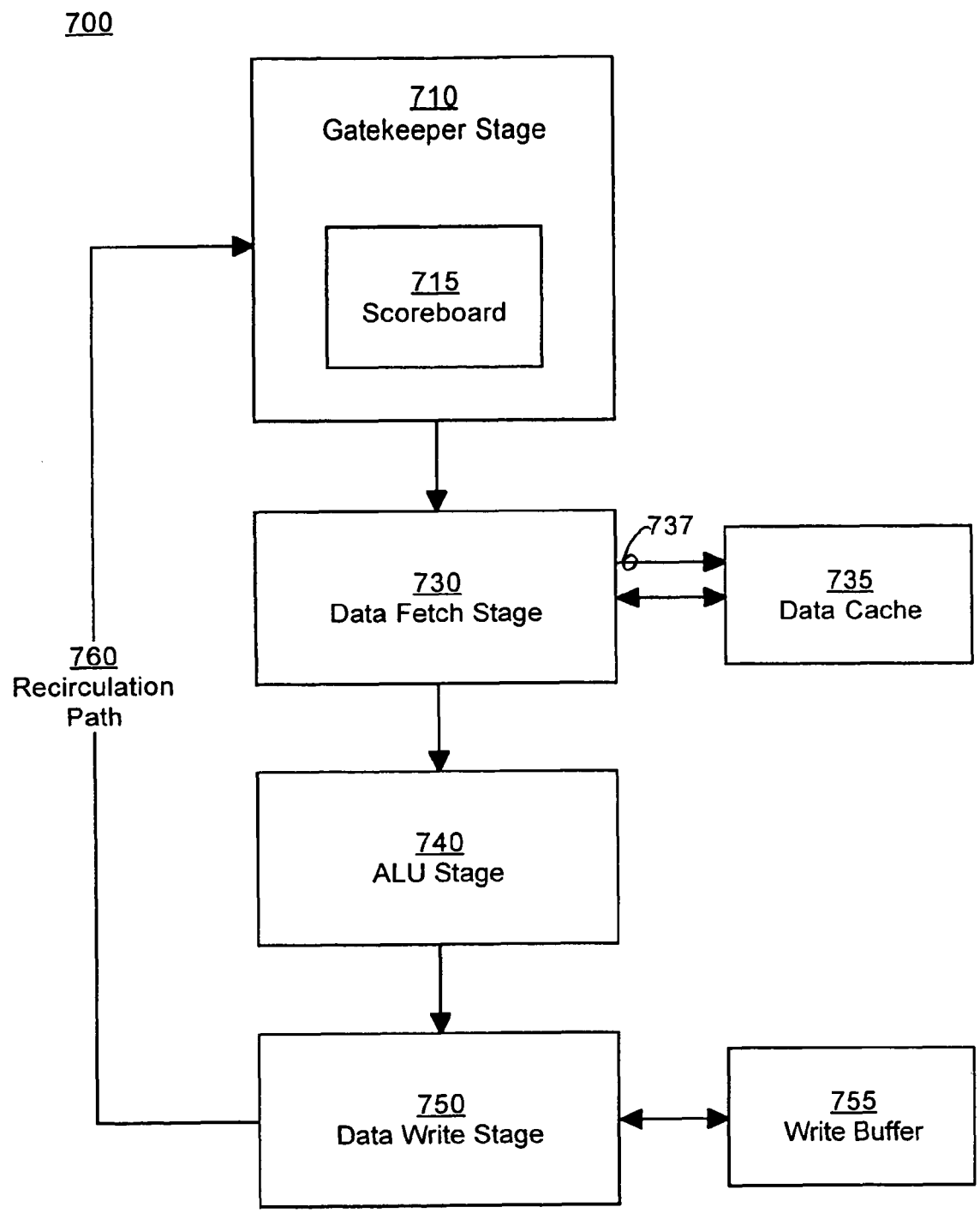
FIG. 7A illustrates a block diagram of an exemplary graphics pipeline, in accordance with an embodiment of the present invention.

FIG. 7A illustrates a block diagram of an exemplary graphics pipeline 700 of a programmable graphics processor, in accordance with an embodiment of the present invention. In one embodiment, graphics pipeline 700 is operable to process pixels for rendering on a display device. It should be appreciated that graphics pipeline 700 is similar to graphics pipeline 100 of FIG. 1 and additionally provides a data fetch cache flushing functionality and provides an enhanced score boarding functionality for screen coincident pixels. In one embodiment, graphics pipeline 700 includes gatekeeper stage 710, data fetch stage 730, Arithmetic Logic Unit (ALU) stage 740, data write stage 750, and a recirculation path 760.

Gatekeeper stage 710 performs a data flow control function of received pixel packets. In one embodiment, gatekeeper stage 710 has an associated scoreboard 715 for scheduling, load balancing, resource allocation, and avoid coherency hazards associated with read-modify-write operations. Scoreboard 715 tracks the entry and retirement of pixels. Pixel packets entering gatekeeper stage 710 set the scoreboard and the scoreboard is reset as the pixel packets drain out of graphics pipeline 700 after completion of processing.

Scoreboard 715 tracks the screen locations of pixels that are being processed by downstream stages of graphics pipeline 700. Scoreboard 715 prevents a hazard where one pixel in a triangle is coincident ("on top of") another pixel being processed and in flight but not yet retired. For example, when a pixel packet is received at gatekeeper stage 710, the screen location for the pixel packet is stored at scoreboard 715. When a second pixel packet having the same screen location is received, scoreboard 715 indicates that another pixel with that screen location is currently being processed by downstream stages of graphics pipeline 700. The coincident pixel may be deleted from entering the downstream pipeline until the other pixel retires.

Figure 7B:
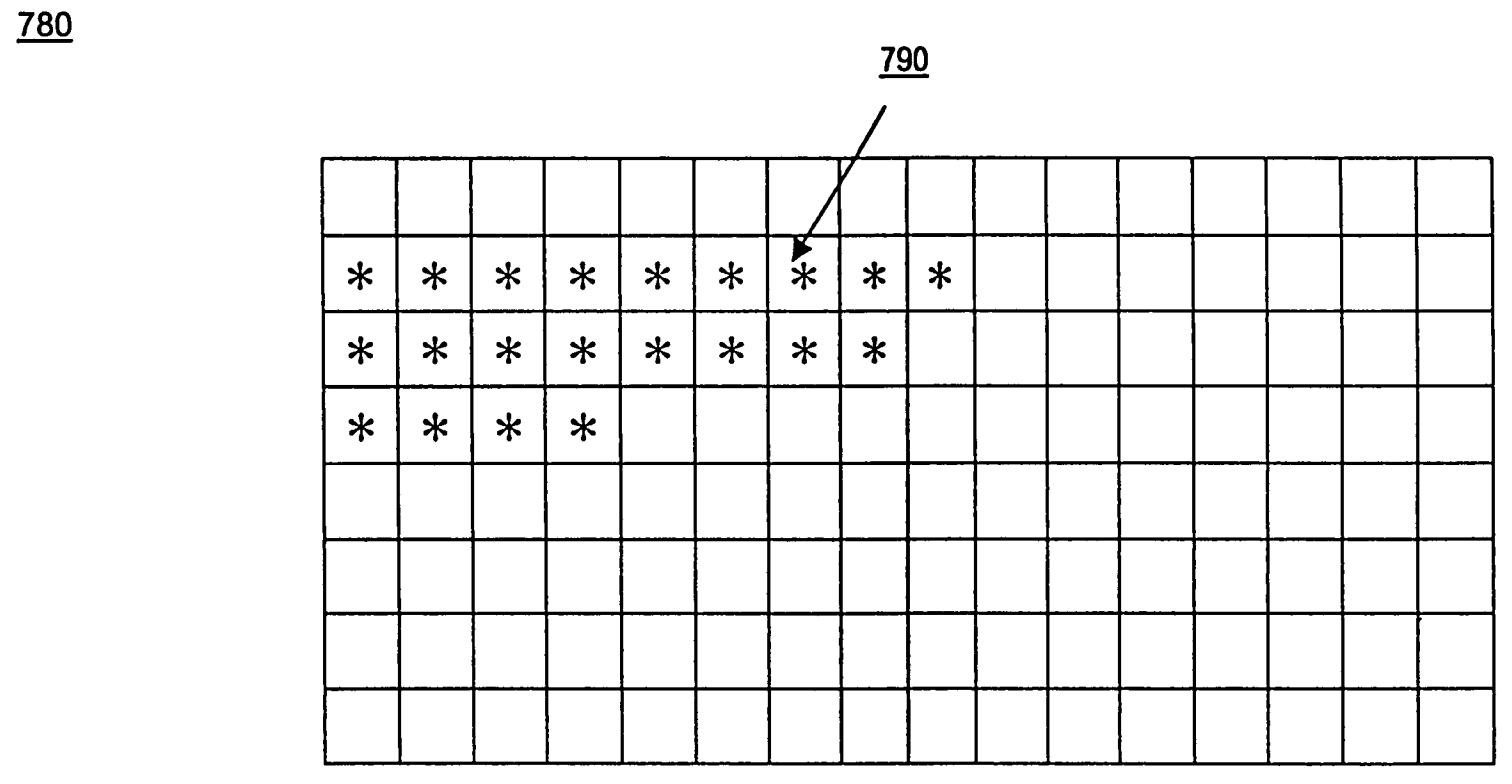

In one embodiment, scoreboard 715 is implemented as a bit mask. FIG. 7B illustrates a diagram of an exemplary bit mask 780 of scoreboard stage 715, in accordance with an embodiment of the present invention. Bit mask 780 is a grid of bits for indicating whether a pixel having a particular (x, y) location is busy (e.g., being processed by graphics pipeline 700). The index to the table may be a hash function (e.g., a sparse hash) of the pixel screen location. For example, bit 790 indicates a particular (x, y) location representing a particular pixel on a display screen. In one embodiment, when a pixel packet enters gatekeeper stage 710, the (x, y) location is referenced on bit mask 780. If the corresponding bit of bit mask 780 is clear, the pixel packet is forwarded to downstream stages of graphics pipeline 700, and the (x, y) location is marked as busy. In one embodiment, a bit mask is 128 bits by 32 bits addressed via a hash (mathematical combination) of the (x,y) location of each pixel. In some cases this hashing process will conservatively keep non-coincident pixels from entering the pipeline (e.g., due to hash collisions) and no incorrect results are generated. The size of the bit mask (and associated hash function) may be tuned to reduce the occurrence of collisions to any acceptable low level. However, it should be appreciated that any size bit mask can be used and any hash function can be employed. For example, bit mask 780 may be a fully associative bit mask, including a bit for every screen position for a display. In particular, bit mask 780 is exemplary, and embodiments of the present invention are not meant to be limited by the bit mask as shown.

In one embodiment, the bit mask contains only a small portion of the total screen positions because rendering within overlapping triangles typically occurs within a very localized screen area. This coupled with the fact that pixels in flight (e.g., in the pipeline at the time) are typically drawn close together and are few in number mean the bit hash can be as small as 200 locations, for instance.

Returning to FIG. 7A, gatekeeper stage 710 controls the flow of pixel packets to downstream stages of graphics pipeline 700. In one embodiment, gatekeeper stage 710 detects screen coincidence between a new pixel and pixels currently processing within downstream stages of graphics pipeline 700. In one embodiment, gatekeeper stage 710 stalls propagation of the new pixel to downstream stages in response to detecting screen coincidence between the pixel and pixels currently processing. In one embodiment, gatekeeper stage 710 stalls the propagation of all new pixels into downstream portions of graphics pipeline 700. In one embodiment, the new pixel that has screen coincidence with a pixel currently being processed is assigned a stall bit. A stall bit indicates that at one point, the corresponding pixel packet caused gatekeeper stage 710 to stall propagation of pixels downstream from gatekeeper stage 710 due to screen coincidence.

A pixel packet that is forwarded downstream of gatekeeper 710 is processed at various stages. In one embodiment, the pixel packet is processed by data fetch stage 730, ALU stage (s) 740, and data write stage 750. Data fetch stage 730 includes an associated data cache 735 and data write stage 750 includes associated write buffer 755. It should be appreciated that data cache 735 and write buffer 755 are coupled to a memory subsystem. In one embodiment, data cache 735 comprises a color cache and a depth cache. In one embodiment if the data fetch pipestage encounters a pixel having an indication that it caused the pipeline to stall, as described above, then the color and depth caches are invalidated.

In one embodiment, data fetch stage 730 accesses data from data cache 735 while processing a pixel packet. In one embodiment, data cache 735 holds 128 bits of data. Data cache 735 may access data from the memory subsystem. It is appreciated that data cache 735 can have a variety of configurations. For example, in one exemplary implementation, data cache 735 includes a separate cache for color, depth and texture (e.g., similar to fetch cache 331). In one exemplary implementation, a flush signal (e.g., 737) is forwarded to data cache 735 in response to a stall bit being set in a pixel packet.

Downstream from data fetch stage 730, data write stage 750 is operable to transmit data to write buffer 755. In one embodiment, write buffer 755 holds 128 bits of data. Data write stage 750 continues to transmit data to write buffer 755 until write buffer 755 is full. The data from write buffer 755 is then transmitted to the memory subsystem.

Upon completion of processing for a pixel packet, a message is sent from data write stage 750 to gatekeeper stage 710 over recirculation path 760. The message indicates that the pixel has completed processing. In response to receiving the message, scoreboard 715 is updated to indicate that the screen location associated with the pixel is now free, and that processing can commence on another pixel having the same screen location. In one embodiment, the corresponding bit in a bit mask is cleared.

Gatekeeper stage 710 is operable to restart propagation of pixels to downstream stages in response to the first screen coincident pixel completing processing. As discussed above, in one embodiment, gatekeeper stage 710 invalidates data cache 735 upon restarting propagation of pixels. In one embodiment, data cache 735 is invalidated in response to detecting a stall bit associated with a pixel packet.

In some pipeline configurations, the above described embodiment may not completely preclude stale data from being fetched into data cache 735 (for example there may exist a sequence of pixels which never stalls in the gatekeeper stage 710 but yet will cause stale data to be fetched due to the difference in granularity between the gatekeeper scoreboard 715 and the size of the data cache 735). In one embodiment, the data fetch stage 730 examines (or snoops) messages on the recirculation path 760, comparing the screen (x,y) locations of the messages to cache tag information and invalidating cache lines which match (or may match, in cases where the messages may be ambiguous) said (x,y) location.

Figure 8:
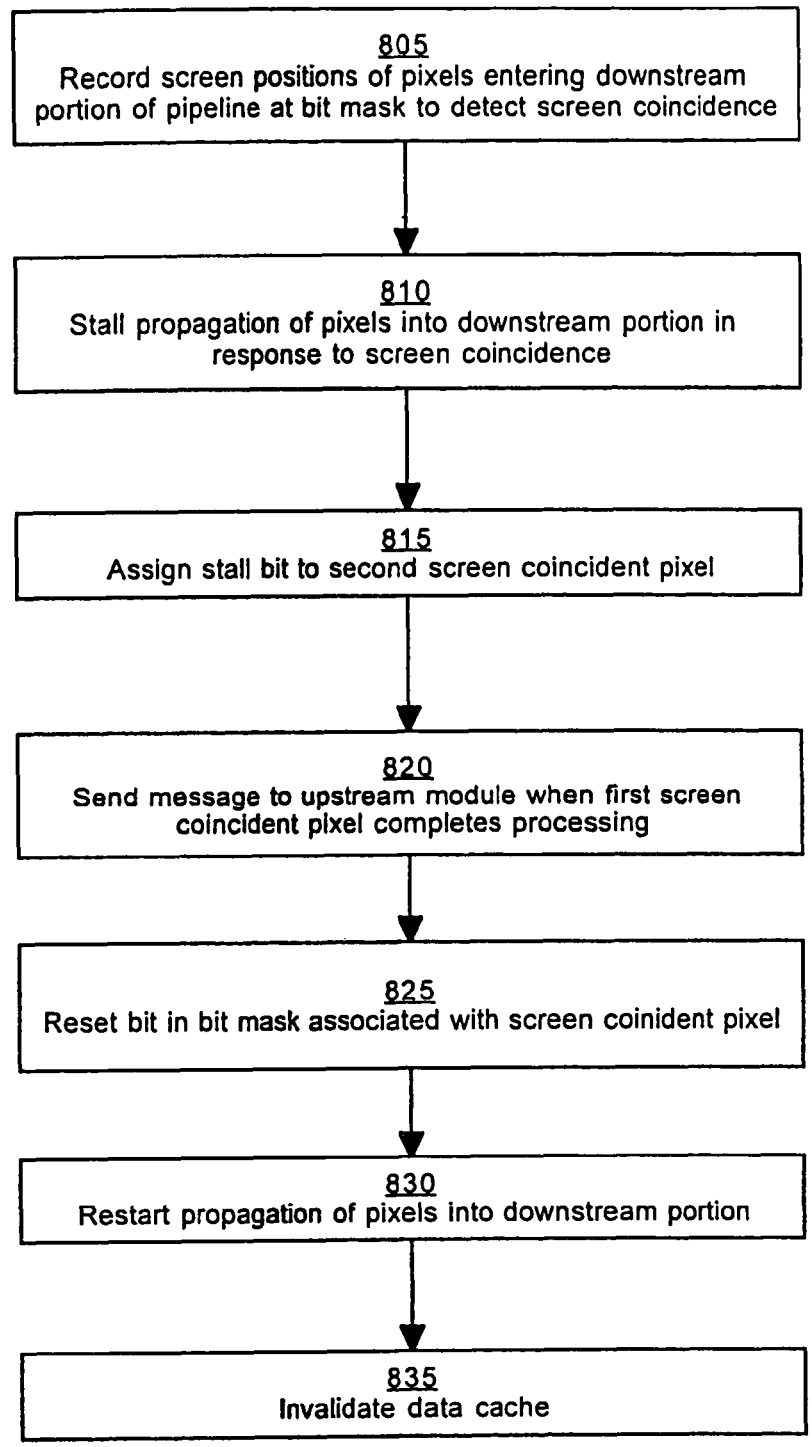
FIG. 8 is a flowchart illustrating an exemplary process of processing pixels in a graphics pipeline, in accordance with an embodiment of the present invention.

FIG. 8 is a flowchart illustrating a process 800 of processing pixels in a graphics pipeline, in accordance with an embodiment of the present invention. Acts of process 800 may be stored as instructions on a computer readable medium and executed on a general-purpose processor. Although specific steps are disclosed in process 800, such steps are exemplary. That is, the embodiments of the present invention are well suited to performing various other steps or variations of the steps recited in FIG. 8. In one embodiment, process 800 is performed by graphics pipeline 700 of FIG. 7A.

At step 805 of FIG. 8, encoded screen positions of pixels processed at an upstream stage of a graphics pipeline are recorded. In one embodiment, the recording is performed to detect screen coincidence between a first pixel and a second pixel in the graphics pipeline wherein the first pixel has entered a downstream pipeline portion of the graphics pipeline but has not yet completed processing within the graphics pipeline. The recording is performed at a gatekeeper stage of the graphics pipeline and is stored in a scoreboard of the gatekeeper stage. In one embodiment, the encoded screen positions are recorded into a bit mask of the scoreboard.

In one embodiment, screen coincidence is determined by setting bits in a bit mask representing screen positions of pixels that are entering the downstream pipeline portion. It is then determined if the bit mask contains a set bit that is associated with a screen position of the second pixel. In one embodiment, the downstream pipeline portion comprises a data fetch stage and a data write stage. In one embodiment, the data fetch stage is the first stage in pipeline order of the downstream pipeline portion. For example, with reference to FIG. 7A, a first pixel is processing at a stage downstream from gatekeeper stage 710. A second pixel enters gatekeeper stage 710, where it is determined whether the first pixel and the second pixel have screen coincidence.

At step 810, propagation of the second pixel into the downstream portion of the graphics pipeline is stalled in response to detecting screen coincidence between the first pixel and the second pixel. In one embodiment, propagation of the second pixel is stalled until the first pixel completes processing within the graphics pipeline. In one embodiment, the propagation of all pixels after the second pixel is also stalled.

At step 815, a stall bit is assigned to the second pixel in response to detecting screen coincidence. In one embodiment, the stall bit is located in the sideband information of the pixel packet for the second pixel.

At step 820, a message is sent to the upstream stage upon the first pixel having completed processing within the graphics pipeline. The message is sent by a downstream stage of the downstream pipeline portion. In one embodiment, the downstream stage is a data write stage. In one embodiment, the first pixel completes processing within the graphics pipeline when the data write stage writes the pixel to a memory subsystem coupled to the graphics pipeline. It should be appreciated that writing the pixel to the memory subsystem may include receiving the pixel at a memory controller of the memory subsystem. The data write stage downstream from the data fetch stage writes pixels to a memory subsystem coupled to the graphics pipeline. In one embodiment, the pixels to be written are stored in a write buffer. In another embodiment, the first pixel completes processing within the graphics pipeline when the data write stage determines that the graphics pipeline has discarded the first pixel.

At step 825, a bit in said bit mask associated with the first pixel is reset in response to the upstream stage receiving the message. Once a pixel has completed processing (e.g., written to memory subsystem or discarded), its associated bit in the bit mask is reset, indicating that no pixel with that particular screen location is currently in the downstream portion of the graphics pipeline.

At step 830, propagation of pixels into the downstream pipeline portion is restarted. In one embodiment, propagation is restarted in response to determining that a bit associated with the second pixel has been reset.

At step 835, a data cache associated with said data fetch stage is invalidated prior to the data fetch stage obtaining data for the second pixel. In one embodiment, the data cache is invalidated upon the second pixel entering the data fetch stage. In one embodiment, the data cache is invalidated upon the data fetch stage detecting the stall bit. In one embodiment, the data cache comprises a color cache and a depth cache.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. In the claims, the order of elements does not imply any particular order of operations, steps, or the like, unless a particular element makes specific reference to another element as becoming before or after.

What is claimed is:

1. A pixel processing method comprising:
   accessing pixel packet information at a pipestage of a graphics pipeline;
   determining if said pixel packet information contributes to an image display presentation;
   associating said pixel packet information with a pixel packet status indicator wherein said pixel status indicator indicates if said pixel packet information contributes to said image display presentation;
   sending a scoreboard clear signal for said pixel packet to a gatekeeper stage if said pixel packet is determined to not contribute to said image display presentation, and said gatekeeper stage updates scoreboard data in response to said clear signal; and
   forwarding said pixel packet for processing in accordance with said pixel packet status indicator to a downstream pipestage, wherein said pixel status indicator is a kill bit included in a sideband portion of said pixel packet information and is set to prevent logic components from clocking information in a payload portion of said pixel packet information if said pixel status indicator indicates said pixel packet payload portion does not contribute to said image display presentation while continuing to clock said pixel packet sideband portion through remaining stages to a write stage of said graphics pipeline.

2. The pixel processing method of claim 1 wherein said determining includes analyzing if a pixel associated with said pixel packet information is occluded.

3. The pixel processing method of claim 1 wherein said accessing pixel packet information includes retrieving pixel surface attribute values in a single unified data fetch stage at said pipestage.

4. The pixel processing method of claim 1 wherein said pixel status indicator is set to enable logic components if said pixel status indicator indicates said pixel packet information does contribute to said image display presentation.

5. The pixel processing method of claim 1 wherein said pixel packet information comprises a plurality of pixel packet rows and further comprises performing a status indicator coordination process to coordinate a plurality of pixel status indicators respectively associated with each one of said plurality of pixel packet rows.

6. The pixel processing method of claim 5 wherein said status indicator coordination process comprises setting each of said plurality of status indicators to indicate corresponding pixel packet rows do not contribute to said image display presentation if any one of said plurality of pixel status indicators associated with a pixel indicates said pixel does not contribute to image display presentation.

7. A graphics processing pipeline in a hand held device comprising:
a raster stage for generating a pixel packet;
a gatekeeper stage for tracking a flow of said pixel packet through said graphics processing pipeline;
a data fetch stage for fetching pixel surface attribute information and including said pixel surface attribute information in said pixel packet, wherein said data fetch stage marks a row of said pixel packet with a status indicator for indicating if further processing operations are to be performed or not performed on a payload portion of said pixel packet, wherein said data fetch stage sends a scoreboard clear signal for said pixel packet to said gatekeeper stage if said pixel packet is determined to not contribute to an image display, and said gatekeeper stage updates a scoreboard data in response to said clear signal; and
downstream pipestages for processing said pixel packet according to said status indicator.

8. The graphics processing pipeline of claim 7 wherein said downstream pipestages comprise:
an arithmetic logic stage for performing processing on said pixel attribute information in accordance with said status indicator, wherein a pixel packet sideband potion of said pixel packet is clocked through said arithmetic logic stage and said pixel packet payload portion is not clocked through said arithmetic logic stage if said status indicator is set to kill said pixel packet payload; and
a data write stage for writing a pixel data value in accordance with said processing and said status indicator.

9. The graphics processing pipeline of claim 8 wherein said status indicator is a kill bit in a sideband portion of said pixel packet.

10. The graphics processing pipeline of claim 8 wherein said status indicator is utilized as an enable bit for an arithmetic logic unit component of said arithmetic logic stage and a data write component of said data write stage.

11. The graphics processing pipeline of claim 8 wherein said pixel packet flows through said arithmetic logic stage and processing is performed on said pixel packet payload portion if said status indicator is not set to kill said pixel packet payload portion.

12. The graphics processing pipeline of claim 8 wherein said pixel packet flows through said arithmetic logic stage and processing is not performed on said pixel packet payload portion if said status indicator is set to kill said pixel packet payload portion.

13. The graphics processing pipeline of claim 8 wherein said pixel packet flows through said data write stage and a pixel data value is written to memory if said status indicator is not set to kill said pixel packet payload portion and said pixel data value is not written if said status indicator is set to kill said pixel packet payload portion.

14. The graphics processing pipeline of claim 8 wherein said data write stage notifies said gatekeeper stage when said pixel packet has been processed by said data write stage.

15. The graphics processing pipeline of claim 8 wherein said data fetch stage determines if a pixel associated with said pixel packet is occluded.

16. The graphics processing pipeline of claim 15 wherein said data fetch stage performs a depth comparison to determine if said pixel is occluded.

17. The graphics processing pipeline of claim 16 wherein said data fetch stage performs said depth comparison based upon a z value of said pixel.

18. A method of tracking pixel information in a graphics pipeline of a hand held device comprising:
propagating pixel packets through pipelined modules of said graphics pipeline wherein each pipelined module comprises respective pipestage circuitry;
determining that a particular pixel packet is not required for rendering, wherein said determining is performed within an upstream data fetch module;
in response to said determining, setting a kill bit within said particular pixel packet;
in response to said kill bit being set, preventing a data portion of said particular pixel packet from being clocked through subsequent pipestage circuitry of said graphics pipeline, while continuing to propagate a sideband portion of said particular pixel packet through said subsequent pipestage circuitry of said graphics pipeline notwithstanding said kill bit being set; and
reporting to an upstream scoreboard module by a downstream data write module that said particular pixel packet has propagated through said graphics pipeline.

19. A method as described in claim 18 wherein said determining is performed as a result of a depth test performed on said particular pixel packet.

20. A method as described in claim 18 wherein said data portion comprises information related to a color of a pixel associated with said particular pixel packet.

21. A method as described in claim 18 wherein said sideband portion comprises said kill bit.

22. A method as described in claim 21 wherein said sideband portion further comprises an instruction number.

23. A method as described in claim 18 wherein said preventing comprises utilizing said kill bit as an enable signal for said subsequent pipestage circuitry of said graphics pipeline.

24. A method as described in claim 18 wherein said pixel packet comprises a plurality of rows and wherein further each row comprises a respective kill bit.

25. A method as described in claim 24 wherein said setting comprises a pipestage module setting kill bits associated with rows of said plurality of rows of said pixel packet in response to said determining.

26. A method of tracking pixel information in a graphics pipeline comprising:

propagating pixel packets through pipelined modules of said graphics pipeline wherein each pipelined module comprises respective pipestage circuitry;

determining that a particular pixel is not required for rendering;

in response to said determining, setting a first kill bit within a first row of a pixel packet associated with said particular pixel, wherein said kill bit is included in a sideband portion of said pixel packet;

in response to said first kill bit being set, preventing a first data portion of said first row from being clocked through subsequent pipestage circuitry of said graphics pipeline and continuing to clock said sideband portion through subsequent pipestage circuitry to remaining plurality of stages of said graphics pipeline, wherein said pixel packet is forwarded as a single pixel and said pixel packet includes a plurality of rows and said forwarding is coordinated for said plurality of rows, wherein a status indicator coordination process is performed to coordinate a plurality of pixel status indicators respectively associated with each one of said plurality of pixel packet rows, and reporting to an upstream scoreboard module by a downstream data write module that said particular pixel packet has propagated through said graphics pipeline.

27. A method as described in claim 26 wherein said setting further comprises:

setting a second kill bit associated with a second row of said pixel packet associated with said particular pixel; and in response to said second kill bit being set, preventing a second data portion of said second row from being clocked through said subsequent pipestage circuitry of said graphics pipeline.

28. A method as described in claim 27 wherein said first row of said pixel packet is ahead of said second row of said pixel packet in pipeline order.

29. A method as described in claim 27 wherein said first row of said pixel packet is behind said second row of said pixel packet in pipeline order.

30. A method as described in claim 27 wherein said first row comprises a first sideband portion and said first data portion and wherein said second row comprises a second sideband portion and said second data portion, and further comprising continuing to propagate said first and second sideband portions through said subsequent pipestage circuitry of said graphics pipeline notwithstanding said first and second kill bits being set.

31. A method as described in claim 30 wherein said first and second data portions comprise information related to a color of said particular pixel.

* * * * *